(12) United States Patent
Fontijne et al.

(10) Patent No.: US 11,927,668 B2
(45) Date of Patent: Mar. 12, 2024

(54) RADAR DEEP LEARNING

(71) Applicant: QUALCOMM Incorporated, San Diego, CA (US)

(72) Inventors: Daniel Hendricus Franciscus Fontijne, Haarlem (NL); Amin Ansari, San Diego, CA (US); Bence Major, Amsterdam (NL); Ravi Teja Sukhavasi, La Jolla, CA (US); Radhika Dilip Gowaikar, San Diego, CA (US); Xinzhou Wu, San Diego, CA (US); Sundar Subramanian, San Diego, CA (US); Michael John Hamilton, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 791 days.

(21) Appl. No.: 16/698,870

(22) Filed: Nov. 27, 2019

(65) Prior Publication Data
US 2021/0255304 A1 Aug. 19, 2021

Related U.S. Application Data

(60) Provisional application No. 62/774,018, filed on Nov. 30, 2018.

(51) Int. Cl.
*G01S 13/60* (2006.01)
*G01S 7/02* (2006.01)
(Continued)

(52) U.S. Cl.
CPC ............ *G01S 13/931* (2013.01); *G01S 7/022* (2013.01); *G01S 7/417* (2013.01); *G01S 13/60* (2013.01);
(Continued)

(58) Field of Classification Search
CPC .......... G01S 13/60; G01S 7/022; G01S 7/417; G01S 17/931; G01S 7/2955;
(Continued)

(56) References Cited

U.S. PATENT DOCUMENTS 5,541,590 A * 7/1996 Nishio ................... B60K 28/14
348/148
10,157,331 B1 * 12/2018 Tang ..................... G06V 10/82
(Continued)

FOREIGN PATENT DOCUMENTS

DE 102017207442 A1 11/2018
WO 0113141 A2 2/2001

OTHER PUBLICATIONS

Y. Gürcan and A. Yarovoy, "Super-resolution algorithm for joint range-azimuth-Doppler estimation in automotive radars," 2017 European Radar Conference (EURAD), 2017, pp. 73-76, doi: 10.23919/EURAD.2017.8249150. (Year: 2017).*

(Continued)

*Primary Examiner* — Timothy A Brainard
*Assistant Examiner* — Ismaaeel A. Siddiquee
(74) *Attorney, Agent, or Firm* — QUALCOMM Incorporated

(57) ABSTRACT

Disclosed are techniques for employing deep learning to analyze radar signals. In an aspect, an on-board computer of a host vehicle receives, from a radar sensor of the vehicle, a plurality of radar frames, executes a neural network on a subset of the plurality of radar frames, and detects one or more objects in the subset of the plurality of radar frames based on execution of the neural network on the subset of the plurality of radar frames. Further, techniques for transforming polar coordinates to Cartesian coordinates in a neural network are disclosed. In an aspect, a neural network receives a plurality of radar frames in polar coordinate
(Continued)

space, a polar-to-Cartesian transformation layer of the neural network transforms the plurality of radar frames to Cartesian coordinate space, and the neural network outputs the plurality of radar frames in the Cartesian coordinate space.

21 Claims, 15 Drawing Sheets

(51) Int. Cl.
| | | |
|---|---|---|
| G01S 7/41 | (2006.01) | |
| G01S 13/931 | (2020.01) | |
| G01S 17/931 | (2020.01) | |
| G06V 10/764 | (2022.01) | |
| G06V 10/80 | (2022.01) | |
| G06V 10/82 | (2022.01) | |
| G06V 20/10 | (2022.01) | |
| G06V 20/58 | (2022.01) | |
| G06V 20/70 | (2022.01) | |
| G01S 7/295 | (2006.01) | |
| G01S 13/86 | (2006.01) | |
| G01S 13/89 | (2006.01) | |
| G01S 17/89 | (2020.01) | |
| G06F 18/2413 | (2023.01) | |
| G06F 18/25 | (2023.01) | |
| G06N 3/044 | (2023.01) | |
| G06N 3/045 | (2023.01) | |
| G06N 3/08 | (2023.01) | |

(52) U.S. Cl.
CPC .......... *G01S 17/931* (2020.01); *G06V 10/764* (2022.01); *G06V 10/803* (2022.01); *G06V 10/82* (2022.01); *G06V 20/10* (2022.01); *G06V 20/58* (2022.01); *G06V 20/70* (2022.01); *G01S 7/2955* (2013.01); *G01S 13/865* (2013.01); *G01S 13/867* (2013.01); *G01S 13/89* (2013.01); *G01S 17/89* (2013.01); *G06F 18/24133* (2023.01); *G06F 18/251* (2023.01); *G06N 3/044* (2023.01); *G06N 3/045* (2023.01); *G06N 3/08* (2013.01)

(58) Field of Classification Search
CPC ...... G01S 13/865; G01S 13/867; G01S 13/89; G01S 17/89; G01S 13/931; G06K 9/6289; G06K 9/6271; G06N 3/0445; G06N 3/0454; G06N 3/08; G06V 10/764; G06V 10/803; G06V 10/82; G06V 20/10; G06V 20/58; G06V 20/70

See application file for complete search history.

(56) References Cited

U.S. PATENT DOCUMENTS

| | | | |
|---|---|---|---|
| 10,176,388 B1* | 1/2019 | Ghafarianzadeh | G06V 10/94 |
| 10,353,053 B2 | 7/2019 | Rohani et al. | |
| 10,468,062 B1 | 11/2019 | Levinson et al. | |
| 10,503,174 B1 | 12/2019 | Kim et al. | |
| 10,762,358 B2 | 9/2020 | Myers et al. | |
| 11,340,355 B2 | 5/2022 | Wheeler et al. | |
| 11,479,262 B2 | 10/2022 | Harrison | |
| 11,531,088 B2 | 12/2022 | Popov et al. | |
| 11,556,745 B2 | 1/2023 | Hennings Yeomans et al. | |
| 11,585,896 B2 | 2/2023 | Harrison | |
| 2007/0043452 A1* | 2/2007 | Buscema | G06N 3/048 706/2 |
| 2010/0052977 A1* | 3/2010 | Sathyendra | G01S 7/411 342/25 F |
| 2016/0174902 A1* | 6/2016 | Georgescu | G06V 10/454 600/408 |
| 2018/0348374 A1* | 12/2018 | Laddha | G01S 17/931 |
| 2019/0045203 A1* | 2/2019 | Varadarajan | H04N 19/42 |
| 2019/0204834 A1 | 7/2019 | Harrison | |
| 2019/0220737 A1 | 7/2019 | Yao | |
| 2019/0279005 A1* | 9/2019 | Ogale | B60R 1/00 |
| 2019/0331768 A1* | 10/2019 | Harrison | G06F 18/217 |
| 2019/0361454 A1* | 11/2019 | Zeng | G05D 1/0214 |
| 2020/0301013 A1* | 9/2020 | Banerjee | G01S 13/867 |
| 2020/0348670 A1* | 11/2020 | Michalakis | G06V 10/764 |
| 2020/0380316 A1* | 12/2020 | Lee | G06T 7/62 |
| 2021/0103027 A1 | 4/2021 | Harrison | |

OTHER PUBLICATIONS

Aleksandar A., et al., "Practical Classification of Different Moving Targets Using Automotive Radar and Deep Neural Networks," IET Radar Sonar Navigation, The Institution of Engineering and Technology, UK, vol. 12, No. 10, Oct. 1, 2018 (Oct. 1, 2018), XP006069594, ISSN: 1751-8784, DOI: 10.1049/IET-RSN.2018.0103, 8 pages, the whole document.
International Search Report and Written Opinion—PCT/US2019/063849—ISA/EPO—dated Jun. 25, 2020.
Partial International Search Report—PCT/US2019/063849—ISA/EPO—dated Feb. 17, 2020.
Taiwan Search Report—TW108143477—TIPO—May 2, 2023.

* cited by examiner

RADAR DEEP LEARNING

CROSS-REFERENCE TO RELATED APPLICATIONS

The present application for patent claims the benefit of U.S. Provisional Application No. 62/774,018, entitled "RADAR DEEP LEARNING," filed Nov. 30, 2018, assigned to the assignee hereof, and expressly incorporated herein by reference in its entirety.

INTRODUCTION

1. Field of the Disclosure

Aspects of this disclosure relate generally to radar deep learning.

2. Background

Radar and camera sensors are often employed on vehicles to enable systems for enhanced vehicle safety, such as adaptive cruise control (ACC), forward collision warning (FCW), collision mitigation or avoidance via autonomous braking, pre-crash functions such as airbag arming or pre-activation, and lane departure warning (LDW). Systems that employ both radar and camera sensors can provide a high level of active safety capability and are increasingly available on production vehicles.

One or more camera sensors mounted on a vehicle capture images of the scene in front of the vehicle, and possibly behind and to the sides of the vehicle. A digital signal processor (DSP) within the vehicle then attempts to identify objects within the captured images. Such objects may be other vehicles, pedestrians, road signs, objects within the road of travel, etc. Radar systems may also be used to detect objects along the road of travel. Radar systems utilize radio waves to determine the range, altitude, direction, and/or speed of the objects along the road. A transmitter transmits pulses of radio waves that bounce off of objects in their path. The pulses reflected from the objects return a small part of the radio wave's energy to a receiver, which is typically located at the same location as the transmitter.

The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

Radar-vision fusion methods differ mainly at the fusion level. Low level fusion combines several sources of raw data to produce new raw data that is expected to be more informative and synthetic than the inputs. In intermediate level fusion, various features, such as edges, corners, lines, texture parameters, etc., are combined into a feature map that is then used by further processing stages. In high level fusion, each source of input yields a decision and the decisions are fused.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of employing deep learning to analyze radar signals performed by an on-board computer of a host vehicle includes receiving, from a radar sensor of the host vehicle, a plurality of radar frames; executing a neural network on at least a subset of the plurality of radar frames; and detecting one or more objects in the subset of the plurality of radar frames based on execution of the neural network on the subset of the plurality of radar frames.

In an aspect, a method of transforming polar coordinates to Cartesian coordinates in a neural network performed by an on-board computer of a host vehicle includes receiving a plurality of radar frames or one or more latent representations of the plurality of radar frames in polar coordinate space; transforming the plurality of radar frames or the one or more latent representations of the plurality of radar frames from the polar coordinate space to Cartesian coordinate space; and outputting the plurality of radar frames or the one or more latent representations of the plurality of radar frames in the Cartesian coordinate space.

In an aspect, an on-board computer of a host vehicle includes at least one processor configured to: receive, from a radar sensor of the host vehicle, a plurality of radar frames; execute a neural network on at least a subset of the plurality of radar frames; and detect one or more objects in the subset of the plurality of radar frames based on execution of the neural network on the subset of the plurality of radar frames.

In an aspect, an on-board computer of a host vehicle includes at least one processor configured to: receive a plurality of radar frames or one or more latent representations of the plurality of radar frames in polar coordinate space; transform the plurality of radar frames or the one or more latent representations of the plurality of radar frames from the polar coordinate space to Cartesian coordinate space; and output the plurality of radar frames or the one or more latent representations of the plurality of radar frames in the Cartesian coordinate space.

In an aspect, an on-board computer of a host vehicle includes means for receiving, from a radar sensor of the host vehicle, a plurality of radar frames; means for executing a neural network on at least a subset of the plurality of radar frames; and means for detecting one or more objects in the subset of the plurality of radar frames based on execution of the neural network on the subset of the plurality of radar frames.

In an aspect, an on-board computer of a host vehicle includes means for receiving a plurality of radar frames or one or more latent representations of the plurality of radar frames in polar coordinate space; means for transforming the plurality of radar frames or the one or more latent representations of the plurality of radar frames from the polar coordinate space to Cartesian coordinate space; and means for outputting the plurality of radar frames or the one or more latent representations of the plurality of radar frames in the Cartesian coordinate space.

In an aspect, a non-transitory computer-readable medium storing computer-executable instructions includes computer-executable instructions comprising at least one instruction instructing an on-board computer of a vehicle to receive, from a radar sensor of the host vehicle, a plurality of radar frames; at least one instruction instructing the on-board computer to execute a neural network on at least a subset of the plurality of radar frames; and at least one instruction instructing the on-board computer to detect one or more objects in the subset of the plurality of radar frames based on execution of the neural network on the subset of the plurality of radar frames.

In an aspect, a non-transitory computer-readable medium storing computer-executable instructions includes computer-executable instructions comprising at least one instruction instructing an on-board computer of a vehicle to receive a plurality of radar frames or one or more latent representations of the plurality of radar frames in polar coordinate space; at least one instruction instructing the on-board computer to transform the plurality of radar frames or the one or more latent representations of the plurality of radar frames from the polar coordinate space to Cartesian coordinate space; and at least one instruction instructing the on-board computer to output the plurality of radar frames or the one or more latent representations of the plurality of radar frames in the Cartesian coordinate space.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
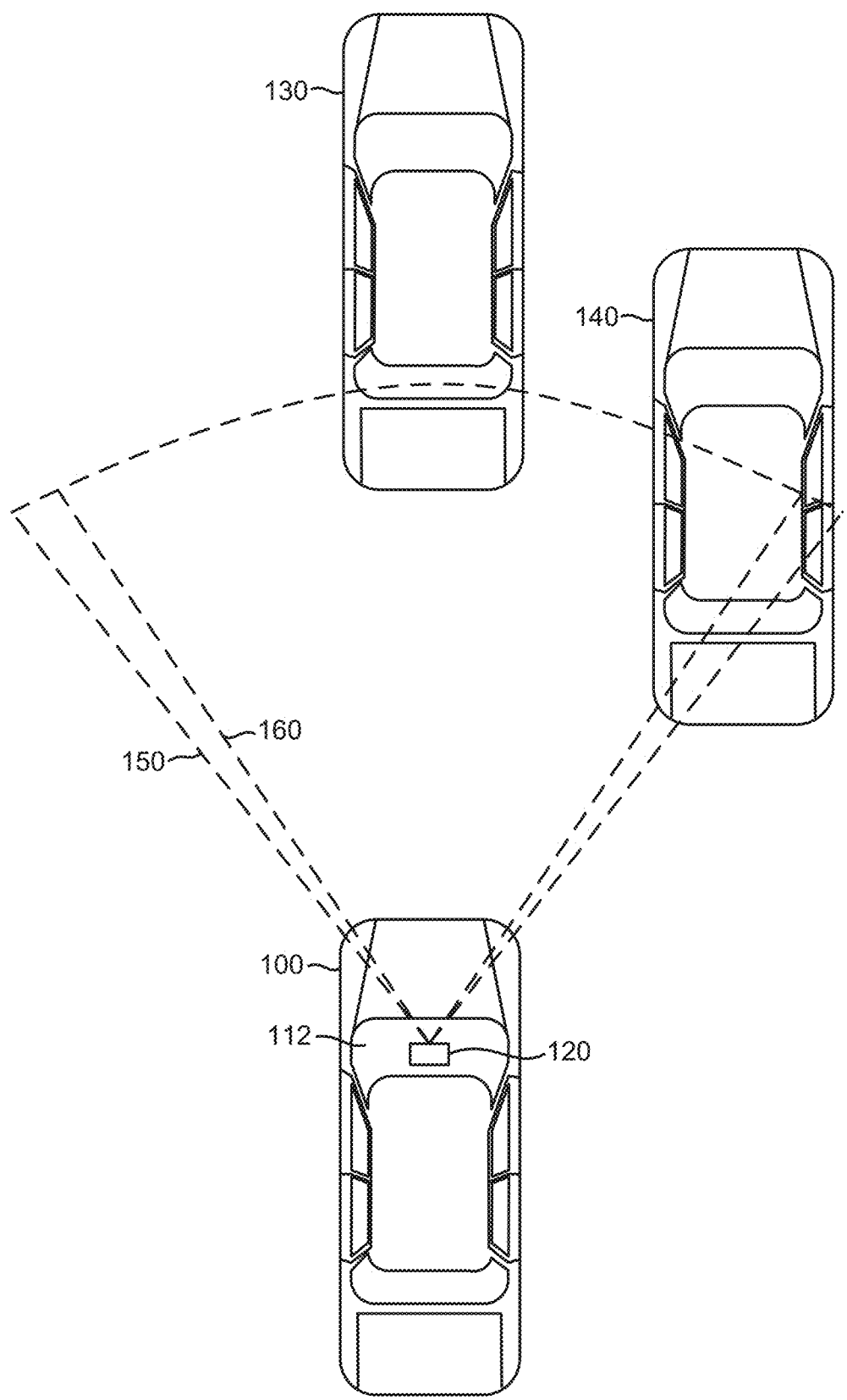
FIG. 1 is a top view of a vehicle employing an integrated radar-camera sensor behind the windshield, according to various aspects.

Referring now to FIG. 1, a vehicle 100 (referred to as an "ego vehicle" or "host vehicle") is illustrated that includes a radar-camera sensor module 120 located in the interior compartment of the vehicle 100 behind the windshield 112. The radar-camera sensor module 120 includes a radar component configured to transmit radar signals through the windshield 112 in a horizontal coverage zone 150 (shown by dashed lines), and receive reflected radar signals that are reflected off of any objects within the coverage zone 150. The radar-camera sensor module 120 further includes a camera component for capturing images based on light waves that are seen and captured through the windshield 112 in a horizontal coverage zone 160 (shown by dashed lines).

Although FIG. 1 illustrates an example in which the radar component and the camera component are collocated components in a shared housing, as will be appreciated, they may be separately housed in different locations within the vehicle 100. For example, the camera may be located as shown in FIG. 1, and the radar component may be located in the grill or front bumper of the vehicle 100. Additionally, although FIG. 1 illustrates the radar-camera sensor module 120 located behind the windshield 112, it may instead be located in a rooftop sensor array, or elsewhere. Further, although FIG. 1 illustrates only a single radar-camera sensor module 120, as will be appreciated, the vehicle 100 may have multiple radar-camera sensor modules 120 pointed in different directions (to the sides, the front, the rear, etc.). The various radar-camera sensor modules 120 may be under the "skin" of the vehicle (e.g., behind the windshield 112, door panels, bumpers, grills, etc.) or within a rooftop sensor array.

The radar-camera sensor module 120 may detect one or more (or none) objects relative to the vehicle 100. In the example of FIG. 1, there are two objects, vehicles 130 and 140, within the horizontal coverage zones 150 and 160 that the radar-camera sensor module 120 can detect. The radar-camera sensor module 120 may estimate parameters of the detected object(s), such as the position, range, direction, speed, size, classification (e.g., vehicle, pedestrian, road sign, etc.), and the like. The radar-camera sensor module 120 may be employed onboard the vehicle 100 for automotive safety applications, such as adaptive cruise control (ACC), forward collision warning (FCW), collision mitigation or avoidance via autonomous braking, lane departure warning (LDW), and the like.

Collocating the camera and radar permits these components to share electronics and signal processing, and in particular, enables early radar-camera data fusion. For example, the radar and camera may be integrated onto a single board. A joint radar-camera alignment technique may be employed to align both the radar and the camera. However, collocation of the radar and camera is not required to practice the techniques described herein.

Figure 2:
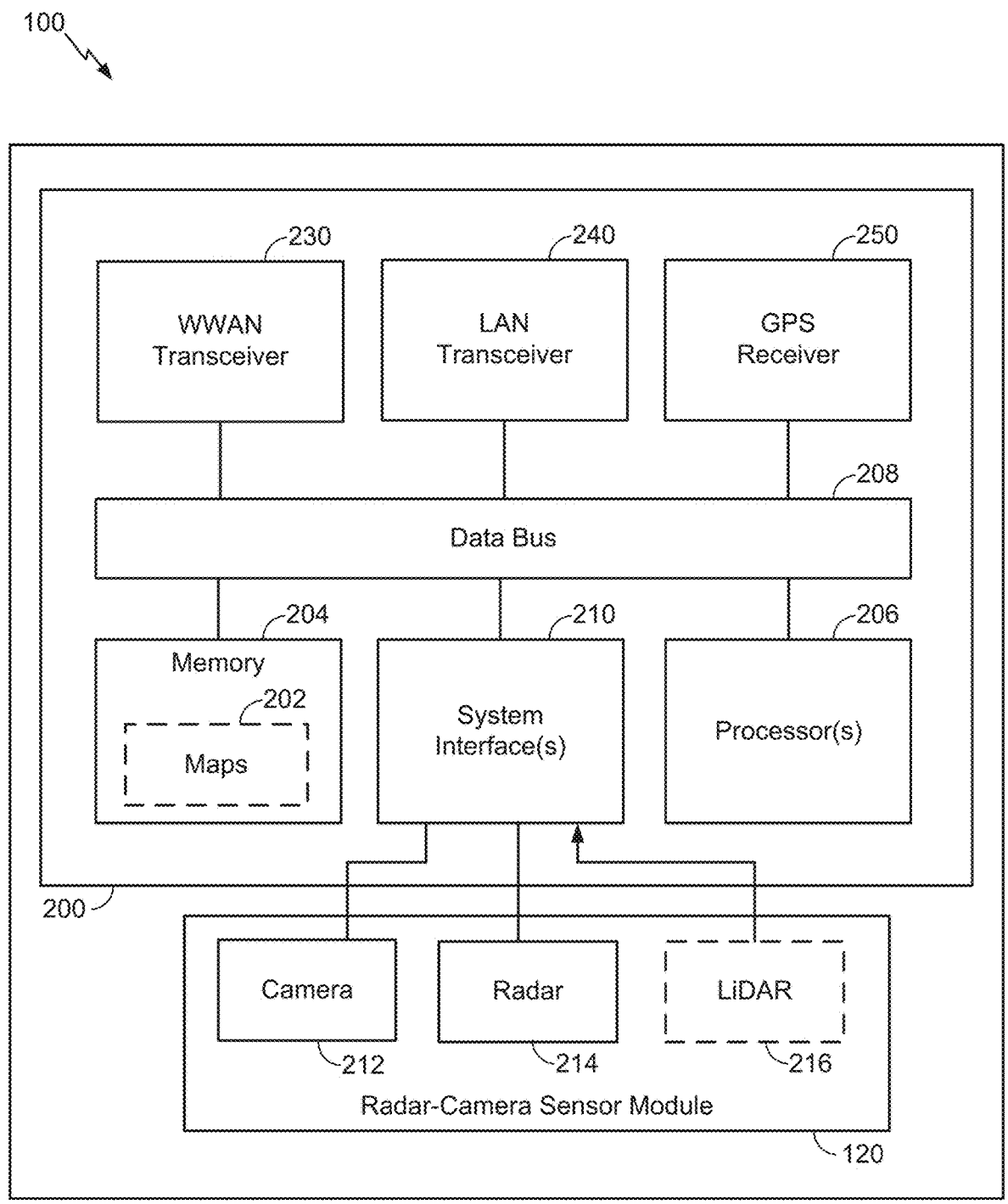
FIG. 2 illustrates an on-board computer architecture, according to various aspects.

FIG. 2 illustrates an on-board computer (OBC) 200 of a vehicle 100, according to various aspects of the disclosure. In an aspect, the OBC 200 may be part of an ADAS or ADS. The OBC 200 includes a non-transitory computer-readable storage medium, i.e., memory 204, and one or more processors 206 in communication with the memory 204 via a data bus 208. The memory 204 includes one or more storage modules storing computer-readable instructions executable by the processor(s) 206 to perform the functions of the OBC 200 described herein. For example, the processor(s) 206 in conjunction with the memory 204 may implement the various neural network architectures described herein.

One or more radar-camera sensor modules 120 are coupled to the OBC 200 (only one is shown in FIG. 2 for simplicity). In some aspects, the radar-camera sensor module 120 includes at least one camera 212, at least one radar 214, and an optional light detection and ranging (LiDAR) sensor 216. The OBC 200 also includes one or more system interfaces 220 connecting the processor(s) 206, by way of the data bus 208, to the radar-camera sensor module 120 and, optionally, other vehicle sub-systems (not shown).

The OBC 200 also includes, at least in some cases, a wireless wide area network (WWAN) transceiver 230 configured to communicate via one or more wireless communication networks (not shown), such as an NR network, an LTE network, a GSM network, and/or the like. The WWAN transceiver 230 may be connected to one or more antennas (not shown) for communicating with other network nodes, such as other vehicle UEs, pedestrian UEs, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceiver 230 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 200 also includes, at least in some cases, a wireless local area network (WLAN) transceiver 240. The WLAN transceiver 240 may be connected to one or more antennas (not shown) for communicating with other network nodes, such as other vehicle UEs, pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The WLAN transceiver 240 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 200 also includes, at least in some cases, a global positioning systems (GPS) receiver 250. The GPS receiver 250 may be connected to one or more antennas (not shown) for receiving satellite signals. The GPS receiver 250 may comprise any suitable hardware and/or software for receiving and processing GPS signals. The GPS receiver 250 requests information and operations as appropriate from the other systems, and performs the calculations necessary to determine the vehicle's 100 position using measurements obtained by any suitable GPS algorithm.

In an aspect, the OBC 200 may utilize the WWAN transceiver 230 and/or the WLAN transceiver 240 to download one or more maps 202 that can then be stored in memory 204 and used for vehicle navigation. Map(s) 202 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 100. Map(s) 202 may also provide electronic horizon predictive awareness, which enables the vehicle 100 to know what lies ahead.

In an aspect, the camera 212 may capture image frames (also referred to herein as camera frames) of the scene within the viewing area of the camera 212 (as illustrated in FIG. 1 as horizontal coverage zone 160) at some periodic rate. Likewise, the radar 214 may capture radar frames of the scene within the viewing area of the radar 214 (as illustrated in FIG. 1 as horizontal coverage zone 150) at some periodic rate. The periodic rates at which the camera 212 and the radar 214 capture their respective frames may be the same or different. Each camera and radar frame may be time-stamped. Thus, where the periodic rates are different, the timestamps can be used to select simultaneously, or nearly simultaneously, captured camera and radar frames for further processing (e.g., fusion).

Figure 3:
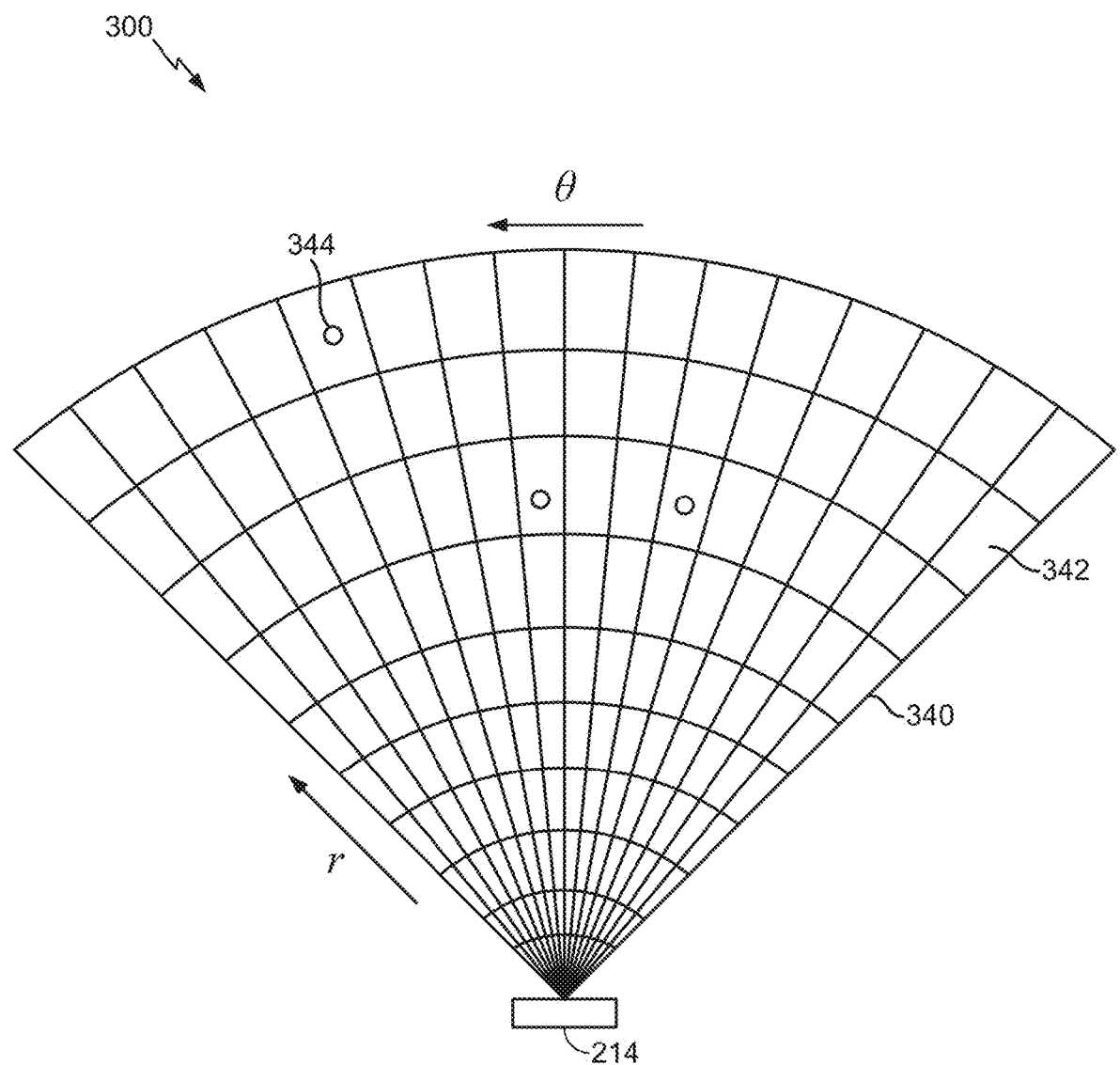
FIG. 3 is a schematic of a sensed observation radar grid.

FIG. 3 illustrates a sensed observation radar grid 300. A transmitter (e.g., an array of transmit antennas) of the radar 214 transmits pulses of electromagnetic RF waves that reflect from object(s) in the transmission path, such as vehicles 130 and 140 in FIG. 1. A portion of the electromagnetic RF waves that are reflected from the object(s) are returned to the receiver (e.g., an array of receive antennas) of the radar 214, which is usually located at the same site as the transmitter of the radar 214.

In an aspect, the radar 214 may be an imaging radar that uses beamforming to scan horizontally and vertically. Beamforming is a technique used to aim the effective direction of a radar beam by changing the delay between different transmitting antennas so that the signals add constructively in a specified direction. Thus, the radar 214 may scan horizontally and vertically across the sensing area (e.g., horizontal coverage zone 150) by using a transmitter comprising an array of electronically steered antennas.

The returned response measured by the radar 214 is characterized as an observation grid 340 having a plurality of observation cells 342. Each cell 342 represents the measured returned response value at a specific range (r) and angle/azimuth (θ). Each cell 342 is alternately referred to as a range-angle bin. Features 344 are extracted from the cells 342 to determine whether the feature 344 is an object (e.g., a vehicle 130/140). Each feature 344 within a respective cell 342 can be identified as having up to four parameters: range, Doppler, azimuth, and elevation. This is called a radar frame. As an example, a feature 344 within a cell 342 may be the signal-to-noise ratio (SNR) computed by a constant false alarm rate (CFAR) algorithm. However, it should be understood that other methods may be used to target and identify features 344 within a cell 342.

In contrast to images (e.g., from camera 212), radar signals (e.g., from radar 214) have several unique characteristics. One is specular reflections, in which only certain surfaces on the target having an advantageous orientation reflect the radar signal, which often results in a small number of reflections. A second is non-uniformity, in which objects that appear at the far range of the (range, azimuth) signal space are always smaller and have a different shape than those that appear at closer ranges. This is not the case with camera images.

Figure 4:
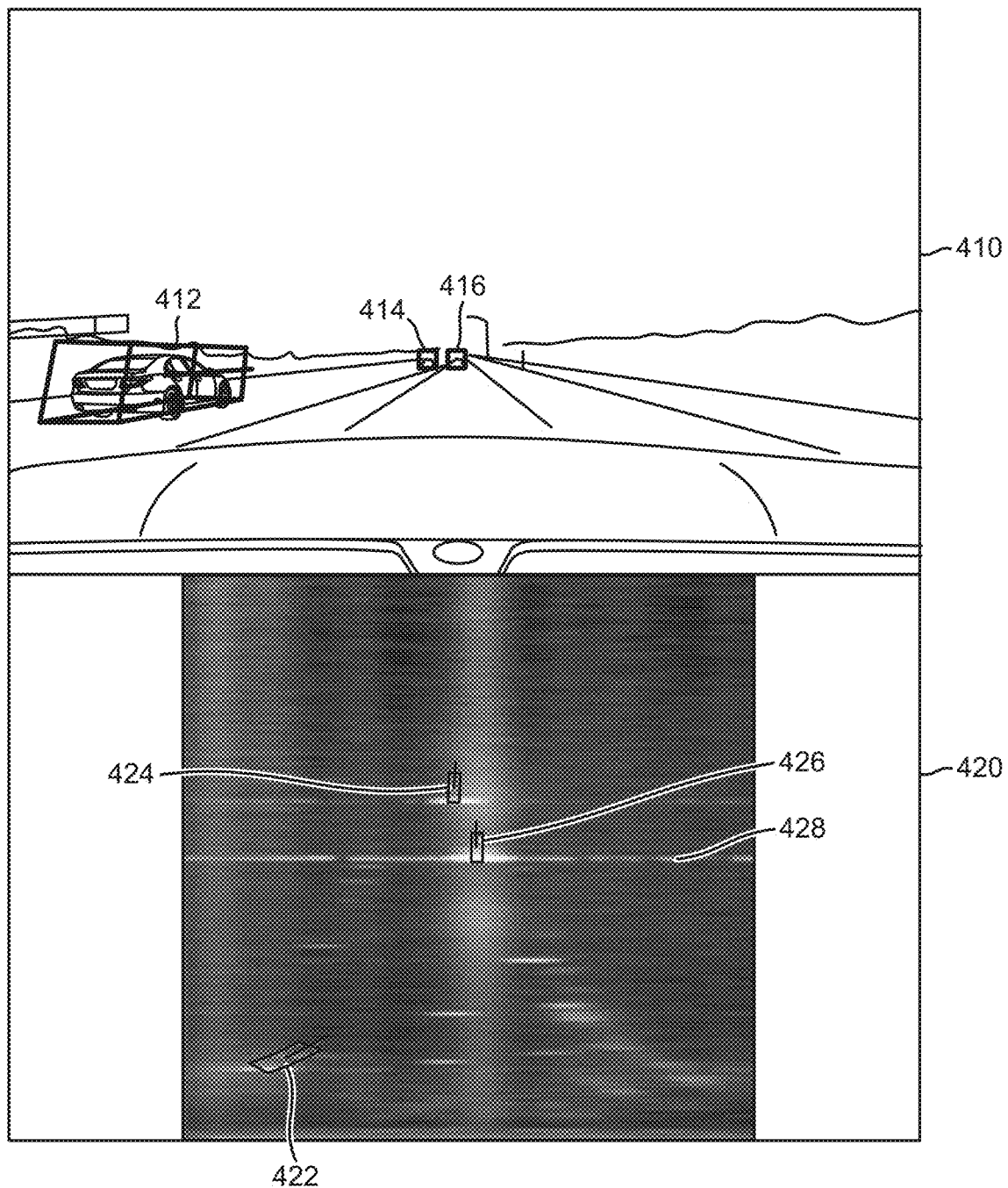
FIG. 4 illustrates exemplary differences between a camera image and a radar image of the same scene.

FIG. 4 illustrates exemplary differences between a camera image 410 and a radar image 420 of the same scene. The camera image 410 may have been captured by the camera 212, and the radar image 420 may have been captured by the radar 214. In the camera image 410, three objects (here, vehicles) have been detected, each surrounded by a bounding box 412, 414, and 416. In the radar image 420, the same three objects (vehicles) have been detected and are surrounded by bounding boxes 422, 424, and 426. As can be seen in FIG. 4, the shapes of the objects/bounding boxes 422, 424, and 426 in the radar image 420 are different sizes and shapes based on whether or not they are below (i.e., bounding box 422) or above (i.e., bounding boxes 424 and 426) the midline 428 of the radar image 420. In addition, the bounding boxes associated with the closer object (i.e., bounding box 422) are larger than the bounding boxes associated with farther objects (i.e., bounding boxes 424 and 426) due to reception at the radar 214 of fewer reflected radio waves due to the greater distance between the radar 214 and the further objects.

Figure 5:
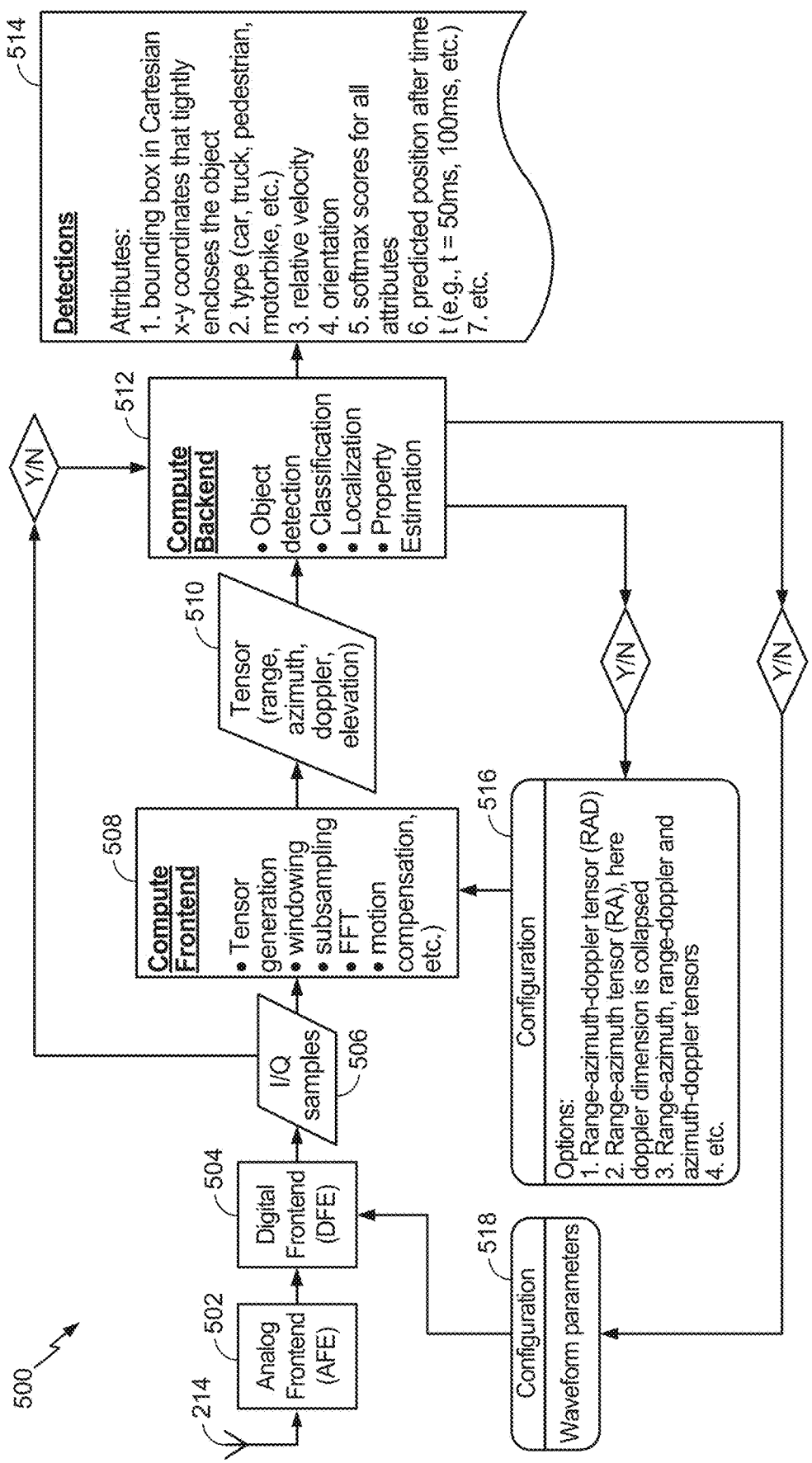
FIG. 5 is a block diagram showing how a radar-camera sensor module and/or one or more processors process data from a radar sensor, according to various aspects.

FIG. 5 is a block diagram 500 showing how the radar-camera sensor module 120 and/or processor(s) 206 processes data from the radar 214, according to various aspects of the disclosure. The data is received as analog data by the analog frontend (AFE) 502 and converted to digital data by the digital frontend (DFE) 504. The digital frontend 504 outputs the I/Q samples 506 of the digital data. The I/Q samples 506 are the raw data that is processed to generate the tensors that will be used during the backend processing.

A compute frontend 508 performs tensor generation, windowing, subsampling, fast Fourier transform (FFT), motion compensation, and the like to generate four dimensional (4D) tensors 510 representing, for example, features 344 within cells 342 of observation grid 340 detected by the radar 214. In an aspect, the radar 214 may be an imaging radar that scans horizontally and vertically. As such, the tensors 510 represent the range (distance from the vehicle 100 to a detected feature 344), azimuth (the horizontal distance between a feature 344 and a reference RF ray emitted by the radar 214, such as the initial RF ray of a radar sweep), Doppler (indicating the speed of a detected feature 344), and elevation (vertical direction from the radar 214 to a detected feature 344) of each detected feature 344. These tensors are then passed to a compute backend 512 that performs object detection, object classification, localization, and property estimation based on the tensors 510 and images received from the camera 212.

The results 514 of the processing performed by the compute backend 512 are various attributes of the detected object(s), such as a bounding box in Cartesian x-y coordinates that tightly encloses the object(s), the type of the object(s) (e.g., car, truck, pedestrian, motorcycle, road sign, etc.), relative (e.g., to the vehicle 100) velocity, orientation, softmax function scores (a probability of a given output of a tensor in binary classification) for all attributes, predicted position(s) of the object(s) after some amount of time (e.g., 50 ms, 100 ms, etc.), and the like.

The results 514 can be fed back to the compute frontend 508 and the digital frontend 504 as configurations 516 and 518, respectively. The configurations 516 may include a range-azimuth-Doppler (RAD) tensor, a range-azimuth (RA) tensor (where the Doppler dimension is collapsed), range-azimuth, range-Doppler, and azimuth-Doppler tensors, and the like for the detected object(s). The compute frontend 508 can use this information to better identify these attributes for other features 344. The configurations 518 may include waveform parameters that the digital frontend 504 can use to better convert the analog data from the analog frontend 502 into I/Q samples 506.

Referring to the compute frontend 508 in greater detail, the compute frontend 508 receives as input I/Q samples 506 from which it computes and outputs the radar frame. The compute frontend 508 may output a 4D complex-valued tensor representing range, azimuth, Doppler, and elevation. Optionally, the compute frontend 508 may sub-select, group, compress, "argmax" (the points of the domain of some function at which the function values are maximized), or "any-function-of" one or more of these dimensions. Alternatively, the compute frontend 508 may output a 3D complex-valued tensor representing range, azimuth, and Doppler. As yet another alternative, the compute frontend 508 may output a set of two-dimensional (2D) complex-valued tensors representing one or more of range and azimuth, range and Doppler, Doppler and azimuth, range and elevation, Doppler and elevation, or azimuth and elevation. Salient information is sometimes contained in the frequency content of the signal, in which case, further signal processing to extract this frequency information can be performed.

In an aspect, the compute frontend 508 can perform normalization of the radar signal. To do so, it computes the mean and standard deviation of the radar signal at each range (using the entire dataset, i.e., all training frames). It then fits a function (e.g., a linear function) to the data and uses that to normalize the radar signal along the range dimension. This provides a minor gain in accuracy (approximately 1%).

Referring to the compute backend 512 in greater detail, the compute backend 512 may implement various "deep learning" techniques (machine learning methods based on learning data representations, as opposed to task-specific algorithms) to determine the results 514. Deep neural networks (may be used to detect, classify, locate and understand objects detected from radar signals. A deep neural network (DNN) is a type of artificial neural network (ANN) having multiple "layers" between the input and output layers. Specifically, a DNN performs multiple mathematical manipulations (referred to as "layers") to calculate the probability of a particular output from a given input. The result of each of these operations (or layers) is a "latent representation" or "latent feature map," except for the last or final result, which is not "latent" anymore, but rather, is the model's prediction/answer/output. For example, a DNN that is trained to recognize types of objects that may be encountered by an autonomous or semi-autonomous vehicle (e.g., vehicle 100) will analyze a given radar frame and calculate the probability that each object detected in the frame is a vehicle, a pedestrian, a road sign, etc. During training of a DNN, a user can review the results and select which probabilities the DNN should display (e.g., outputs having a probability above a certain threshold, etc.) and return the proposed label.

In an aspect, recurrent neural networks (RNNs) can be used by the compute backend 512 as a deep learning technique to determine the results 514. RNNs are a class of ANNs in which connections between nodes form a directed graph along a temporal sequence, which allows RNNs to exhibit temporal dynamic behavior. RNN elements can be used in radar object detection neural networks to improve detection accuracy. Convolutional long short-term memory (LSTM) (a type of RNN capable of learning long-term dependencies), convolutional gated recurrent unit (GRU) (similar to an LSTM with a forget gate, but with fewer parameters than an LSTM because it lacks an output gate), or stacked RNNs can be applied to the latent feature maps of the object detection neural network to build a memory of the recent observations. In practice, convolutional GRUs are more parameter efficient. However, convolutional LSTMs achieve slightly higher accuracy (in terms of mean average precision (mAP), mean absolute error (MAE), precision and recall, etc). In practice, stacked convolutional GRUs do not achieve the same accuracy as a single layer convolutional LSTM. This is likely due to the need for a longer history for achieving high accuracy. Targeting the same accuracy as a full-fledged radar object detection neural network, the number of parameters can be cut by roughly four times. The inference time remains more or less the same as the base network (the network without the LSTM/RNN/GRU module(s), which can be added on top of the "base network) as the addition of memory elements does not impose any noticeable burden. Using RNNs, the full relative velocity vector of an object can be estimated, in contrast to conventional vehicle radars that can only estimate the radial component of the relative velocity. More specifically, an RNN has the ability to look at the position of the objects over multiple time steps (versus only at a given point in time). Based on the known position over a time period, computing the velocity is just a matter of calculating how fast that position has moved. Thus, in conventional radars and using the radar signal only, only relative radial velocity (i.e., the part of the relative velocity that is going towards or away from the radar) can be measured. Velocity in other directions cannot be detected. However, using an RNN, which has a "history," the velocity in other directions can be estimated as well. So the "full" velocity vector is a full 3D vector, as opposed to just the radial part.

Note that convolution is a mathematical operation on two functions to produce a third function that expresses how the shape of one is modified by the other. The term "convolution" refers to both the result function and to the process of computing it. Convolution is similar to cross-correlation; for discrete, real-valued functions, they differ only in an order reversal in one of the functions.

In an aspect, spatially variant convolutions (i.e., different convolution weights to different locations) can be used by the compute backend 512 as a deep learning technique to determine the results 514. In a first solution, local spatial convolution kernels (a convolution operation operates on two signals, the radar frame or latent representation, and the kernel, and combines them into one) can be applied to early layers (i.e., the first stages) of a radar-based object detection neural network. In contrast to camera-based object detection neural networks, a radar frame does not have spatial invariant properties, meaning that in the camera frame, no matter where an object is, it looks more or less the same (putting perspective aside). However, in a radar frame, the range-azimuth signature changes drastically as the ego vehicle (e.g., vehicle 100) moves along either the range or the azimuth. As such, local spatial convolution can be used at the early stage of the object detection neural network to apply different convolution weights (i.e., learned parameters of the model) to different locations on the radar frame or the latent representation After a few layers, these features become more evenly spatially distributed and the weighted shared convolution (a.k.a., group convolution) can be used in the later layers of the network. Since the depth of the feature maps can be relatively small at an early stage of the object detection neural network, this should not impose extremely high overhead in terms of the number of weights.

In a second solution using spatially variant convolutions, micro neural networks (smaller, auxiliary neural networks whose purpose is not to solve the original problem (detecting objects), but to generate these spatially variant kernels and weights) can be used to generate spatially variant kernels and weights. Similar to the previous solution, the number of weights needed to perform spatially variant convolutions can be further reduced. The idea is to use a shallow network (potentially only a few layers) to generate all the weights needed for different kernels. This object detection neural network can be seen as a way of compressing the weights that local spatial convolution kernels might produce by themselves, given that the Kolmogorov complexity (the length of the shortest computer program (in a predetermined programming language) that produces the object as output) of this problem does not appear to be especially high. This network generates a large amount of weights that should be highly correlated and can potentially be used to generate weights for multiple layers. A technique similar to dynamic filter networks (a network in which filters are generated dynamically conditioned on an input) can also be used to generate these weights dynamically by using the {range, azimuth} pair as an input to the object detection neural network for the situations in which storage or bandwidth might be limited and these weights are generated "on the fly."

In a third solution using spatially variant convolutions, an explicit transformation can be used to generate weights for spatially variant kernels applied to radar-based object detection neural networks. An alternative to using an object detection neural network to generate the weights for different kernels of the local spatial convolution is to use an explicit transformation on the weights. Assuming that the oracle filter needed for one of the channels of one of the feature maps is known, the transformation for all the other locations of the same channel (i.e., same color) and the same feature map are known (given the spatial invariant in the Cartesian domain). One issue is that the size of the filters is usually small. To address this issue, the size of the filters can be increased to something larger (e.g., 7×7) and then the transformation can be applied (in a continuous domain) and the resulting kernel can be clipped back to, for example, 3×3 or 5×5. As will be appreciated, the second solution described above is more efficient than the first, and the third solution is more efficient than the second.

Figure 6:
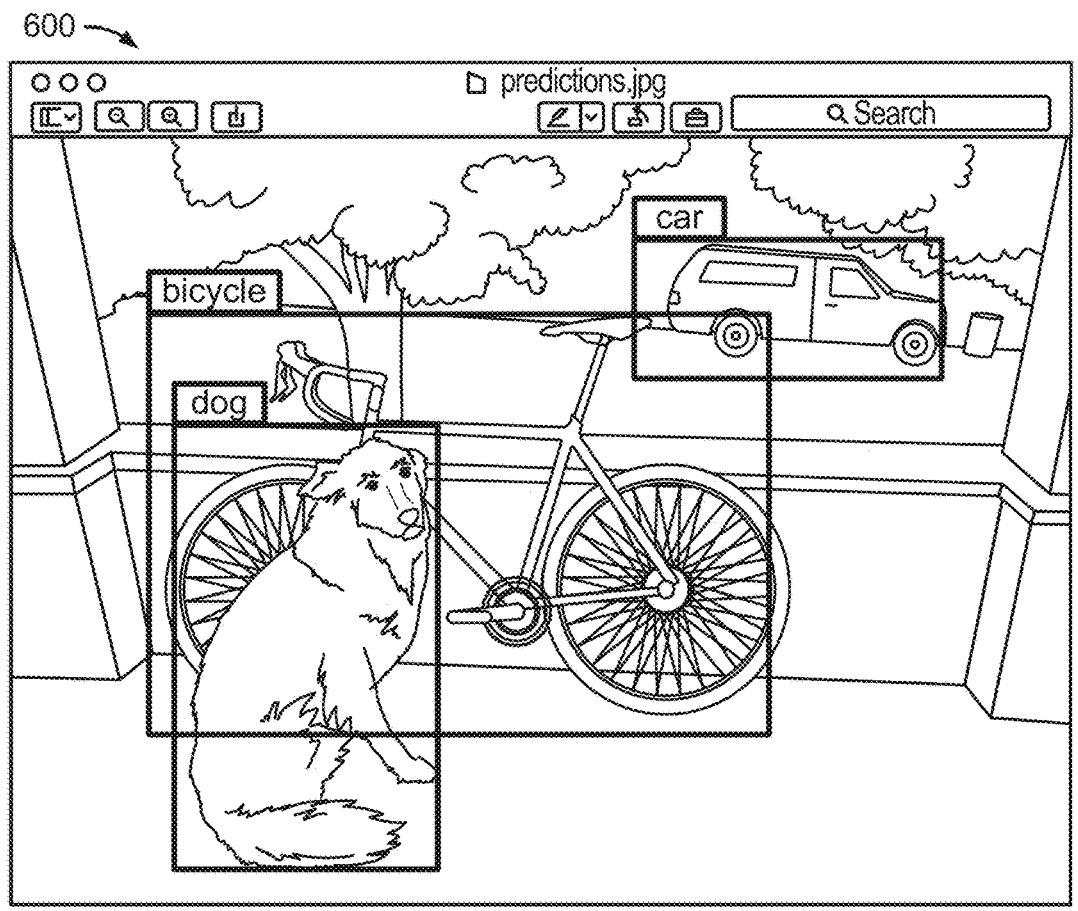
FIG. 6 illustrates an example of computer vision, where occlusion has occurred.

Uncertainty of the object detection neural network's detections may also be estimated based on the network's output. In the case of autonomous driving, most of the time, objects do not overlap in the bird's eye view (the view of FIG. 1, which radar images capture). This is quite different from camera-vision-based networks, where occlusion can also happen in regular settings. For example, as illustrated by image 600 in FIG. 6, three different bounding boxes corresponding to three different objects overlap each other. In an aspect, non-maximum suppression (the combining of multiple bounding boxes around a target object down to one bounding box) can be used in the case of object detection neural networks to suppress bounding boxes that overlap to reduce the number of remaining bounding boxes as well as keep the ones with the highest confidence. Since there should not be overlapping vehicles in the case of radar-based object detection for vehicles, the parameters of non-maximum suppression can be changed to account for this difference (e.g., the overlap threshold and the number of potential bounding boxes can be changed).

Multiple overlapping bounding box predictions may be used to estimate the network's uncertainty about the prediction. Unlike camera images, for radar frames, only one of the overlapping boxes can correspond to a physical target in most cases. As the object detection neural network outputs a set number of bounding boxes at all times, there needs to be a final step in the algorithm for only keeping the most confident detections in cases when multiple detections correspond to the same object. However, the pattern (e.g., density, spread, etc.) in which the detections (corresponding to the same object) overlap with each other may be used to deduce the uncertainty of the system. For example, if detections (corresponding to the same object) have a high variance in position, it might indicate that the object detection neural network is not sure about the location of the object to be detected. This information can be used to estimate the uncertainty of the network on the location of the detection.

Figure 7:
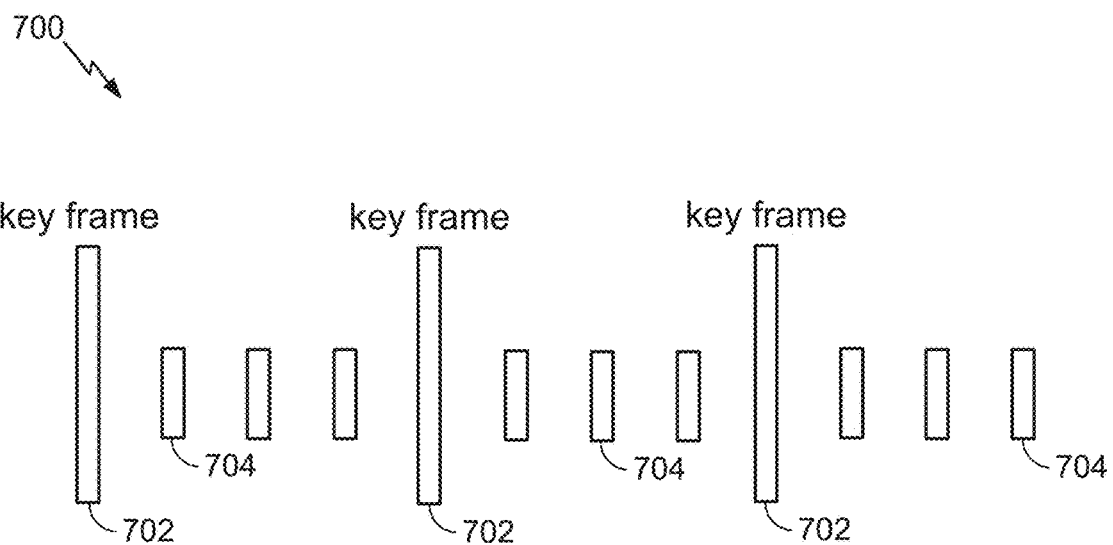
FIG. 7 illustrates a series of key frames and p-frames of a sequence of radar frames.

As another technique disclosed herein to determine the results 514, the compute backend 512 can use recurrent radar-based object detection neural networks to drastically speed up the inference time (i.e., the time it takes the for the model (neural network) to do the computations required to get the final predictions based on the input). Generally, the neural network techniques described above would be performed on each radar frame. One effective way to speed up the average inference time is to run the network only on a subset of radar frames, and predict object detections in the omitted steps (i.e., frames in this context). Similar to a Moving Pictures Expert Group (MPEG) encoder, a subset of radar frames can be identified as key frames (which can be evenly or unevenly distributed in the time axis). These key frames (e.g., key frames 702 in FIG. 7) are fed to an RNN radar-based object detection neural network. Then, the network is trained expecting to output the bounding boxes for the predicted frames (referred to as "p-frames" and illustrated as p-frames 704 in FIG. 7) between the key frames 702. This network learns how to generate (or better synthesize) the high-level feature maps of the future frames so that the single shot detection (SSD) heads can perform an effective object detection on these future frames that the network will not see. This technique should provide a significant improvement in the inference time.

SSD is a method for detecting objects in images using a single deep neural network. SSD discretizes the output space of bounding boxes into a set of default boxes over different aspect ratios and scales per feature map location. At prediction time, the object detection neural network generates scores for the presence of each object category in each default box and produces adjustments to the box to better match the object shape. Additionally, the network combines predictions from multiple feature maps with different resolutions to naturally handle objects of various sizes. The SSD model eliminates proposal generation and subsequent pixel or feature resampling stages and encapsulates all computation in a single network. This makes SSD easy to train and straightforward to integrate into systems that require a detection component.

Expanding on this point, a hybrid tracking technique can be used to speed up inference. Given the fact that the bounding boxes usually do not change drastically from one frame to the next in the case of autonomous driving, a radar-based object detection neural network can be run only on a subset of frames (e.g., key frames 702). For the p-frames (e.g., p-frames 704), a simple tracking approach can be used (e.g., bilinear extrapolation/interpolation—an extension of linear interpolation for interpolating functions of two variables on a rectilinear 2D grid), or a more complex one (e.g., Kalman filtering with tracklets (a small subsection of the path, or "track," of an object between its origin and destination)), to update the location of the bounding boxes. In practice, this may result in a small percentage mAP decrease, but with a corresponding speed.

However, if a new object suddenly appears in a frame, it could be missed by not running the full object detection neural network on every frame. One way to address this is to have a shallow anomaly detection network that can tell when the boundary of key frames should be reset (or act as a key frame detector). This network can be trained using the difference in the ground truth (GT) (information provided by direct observation as opposed to information provided by inference) from frame to frame when running the full object detection neural network. This means that the anomaly detection network can be trained to detect when new objects appear in the scene by using the GT boxes (i.e., annotations). The annotations are tracked through time, with a beginning and an end. Thus, using the GT annotations, it is easy to tell when a frame is an "anomaly"—it is a frame where an object appears for the first time.

Figure 8:
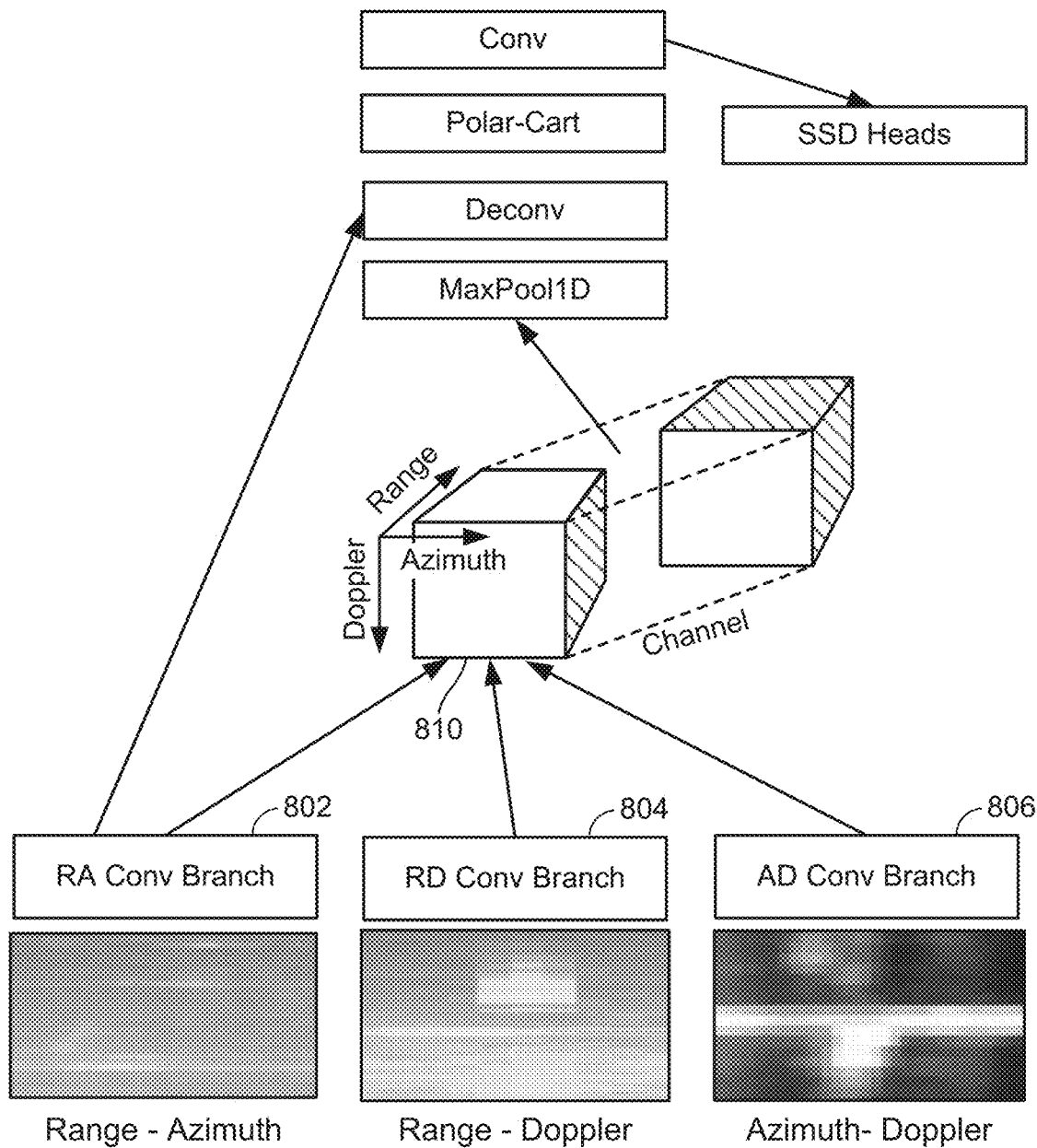
FIG. 8 illustrates an architecture that uses separate feature extraction layers for each 2D slice from a set of chosen slices before fusing them together and following it with the rest of the network.

In yet another aspect, the compute backend 512 can use a neural network architecture that consumes multiple 2D slices of a 4D (range, azimuth, Doppler, elevation) tensor (referred to herein as "SliceNet"). A "slice" is the result of a dimension-reduction method, such as summing the power (of the radar returns) along one or more dimensions. Previously, radar perception relied only on the range-azimuth slice for detecting objects. As a result, Doppler information was effectively ignored. In contrast, FIG. 8 illustrates a SliceNet architecture 800 that uses separate feature extraction layers for each 2D slice from a set of chosen slices (e.g., range-azimuth 802, range-Doppler 804, and azimuth-Doppler 806) before fusing them together as a 3D tensor 810 and following it with the rest of the object detection neural network (i.e., the remaining layers of the object detection network come after this tensor). That means that more convolutional layers follow after the processed slices have been merged into a 3D tensor. Thus, each slice is processed by a dedicated convolutional neural network branch. Then the results are fused into a single 3D tensor, and another convolutional neural network takes this 3D tensor as input and ultimately outputs the object detections. The combined architecture is referred to as "SliceNet." This results in improved performance for object classification and detection at the compute backend 512.

Also disclosed herein are latent space ego motion compensation techniques. When feeding input frames having consecutive timestamps to an object detection neural network, ego motion (the motion of the radar system itself, e.g., radar 214 when vehicle 100 is moving) makes the input from the radar system more difficult for the compute backend 512 to interpret. This can be especially problematic when attempting to predict the motion of detected objects (e.g., other vehicles, pedestrians, etc.). For example, as discussed above with reference to FIG. 4, radar imaging is not translation-equivariant, so compensating for ego-motion is non-trivial. For example, the radar signal cannot be translated in the image plane. The current state of the art LiDAR-based approaches rely on ego-motion compensation, as described in, for example, Luo et al., "Fast and Furious: Real Time End-to-End 3D Detection, Tracking and Motion Forecasting with a Single Convolutional Net," which is incorporated by reference herein in its entirety.

Figure 9:
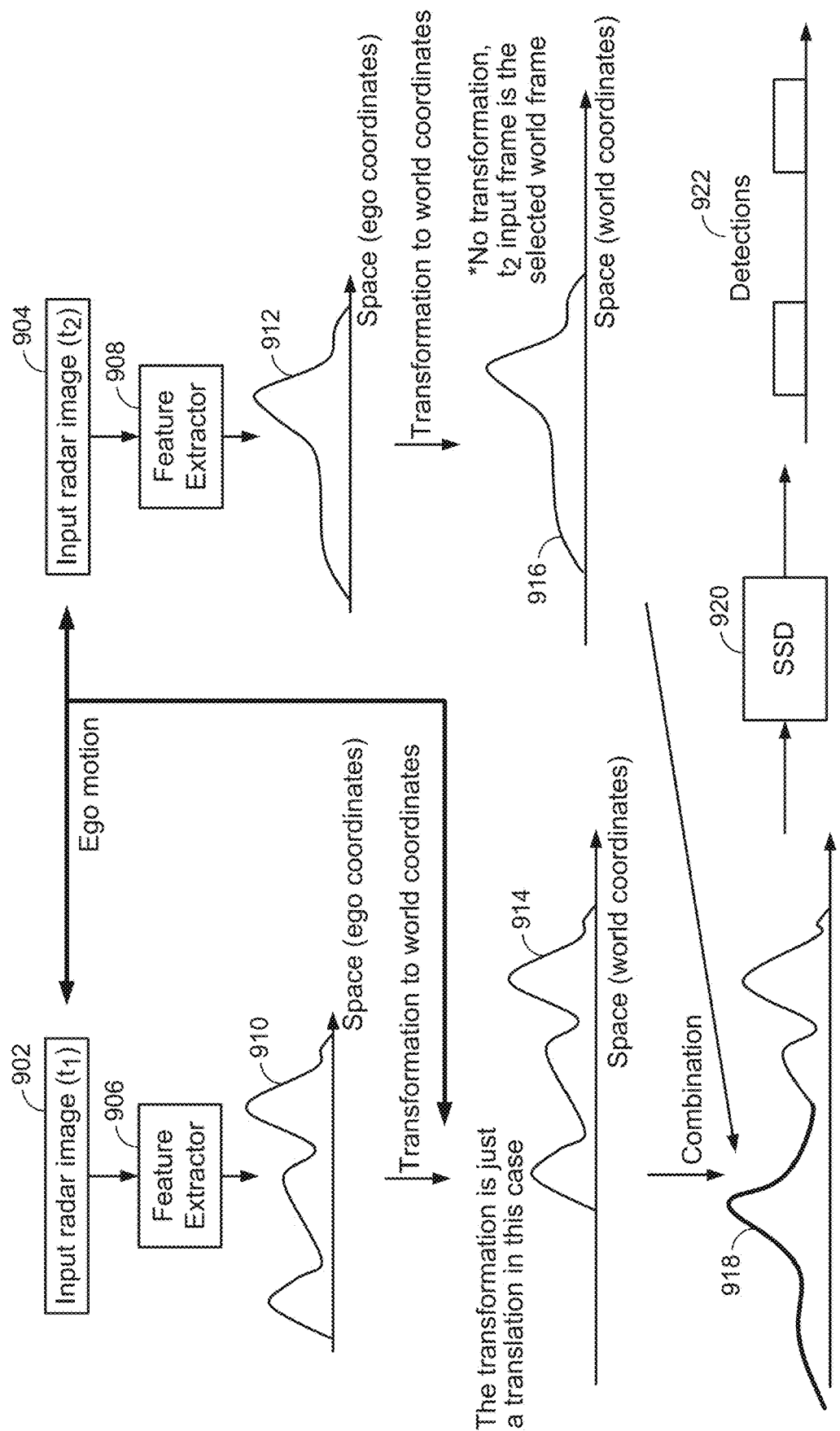
FIG. 9 illustrates a latent-space ego-motion compensation technique, according to various aspects of the disclosure.

To address these issues, the present disclosure provides a latent-space ego-motion compensation technique, illustrated in FIG. 9. With reference to FIG. 9, each input frame 902 and 904 (received at $t_1$ and $t_2$, where the horizontal line represents a change in position of the radar sensor, e.g., radar 214) is fed to a feature extractor 906 and 908, respectively (which may be the same feature extractor, although two feature extractors are illustrated to more clearly show the process flow). The feature extraction also includes a polar-to-Cartesian transformation. The feature map 910/912 generated from one frame 902/904 is a representation of a given region of space. The feature maps 910 and 912 are in "ego coordinates," meaning that the ego point (i.e., the location of the radar sensor) is always at a fixed location on the radar frame or latent representation. Thus, stationary objects move on the map, with the inverse of the ego motion.

Next, the ego motion between frames 902 and 904 is obtained. The ego motion between frames 902 and 904 is the change in the position of the radar sensor. This can be obtained in various ways, such as GPS or other sensors, or the neural network can estimate the motion, including rotation (i.e., a change in orientation of the vehicle 100).

Next, each key frame's 902 and 904 ego coordinates are converted to world coordinates. The conversion process begins by initializing an empty feature tensor, spatially larger than the original one (corresponding to the frames' 902 and 904 feature maps 910 and 912). This new tensor is in "world coordinates," meaning that stationary objects remain in the same location on the feature map over time, and the ego location can change (depending on ego motion). Based on the ego motion from a previous step of the process, each frame's 902 and 904 feature map 910 and 912 is transformed to a new feature map 914 and 916, respectively, in world coordinates. This includes padding the feature maps 914 and/or 916 with 0s in the regions that are unseen but could potentially be seen in other frames.

In the example of FIG. 9, the second frame 904 is chosen as the world frame, and thus, there is no transformation between the feature map 912 and 916. In contrast, the first frame 902 is transformed. In the example of FIG. 9, this transformation is simply a translation on the x-axis.

Next, the resulting set of feature maps (i.e., world coordinate feature maps 914 and 916) are combined into a combined feature map 918. They may be combined in various ways. As a first option, they may be combined using an indexing process. For example, if a region is not seen in any of the frames, it is left as "0" values. If a region is seen on only one frame, those values are used. And if a region is seen on multiple frames, the mean, for example, of those values is used. As a second option, a neural network can be used. The network would take as input the multiple feature maps 914 and 916 in world coordinates and produce the combined feature map 918. The combined feature map 918 is then processed by an SSD 920, which outputs object detections 922.

Also disclosed herein are techniques for cross-sensor annotation of the radar signal (e.g., the output of the radar 214) using the LiDAR sensor 216 and the camera 212. LiDAR is a detection technique in which the LiDAR sensor 216 emits pulsed laser light and measures the reflected laser pulses with a sensor. Differences in laser pulse return times and wavelengths can be used to determine the distance to an object in the path of the laser pulses.

The radar signal can be automatically or manually annotated with data from the LiDAR sensor 216. For automatic LiDAR annotation, the LiDAR signal can be used to detect and localize (e.g., determine the general location of) objects of interest (e.g., vehicles, pedestrians, road signs, etc.). The objects of interest within the generated LiDAR frames can then be identified with 3D bounding boxes. The bounding boxes can be mapped from the LiDAR frames to the radar frames using the extrinsic calibration between the LiDAR sensor 216 and the radar 214.

Manual annotations can be bootstrapped with the automatic annotations described above. For example, radar frames can be manually annotated by a human from scratch, or the automatic annotations can be corrected, by visualizing data from three complimentary sensors, the camera 212, the LiDAR 216, and the radar 214.

Figure 10:
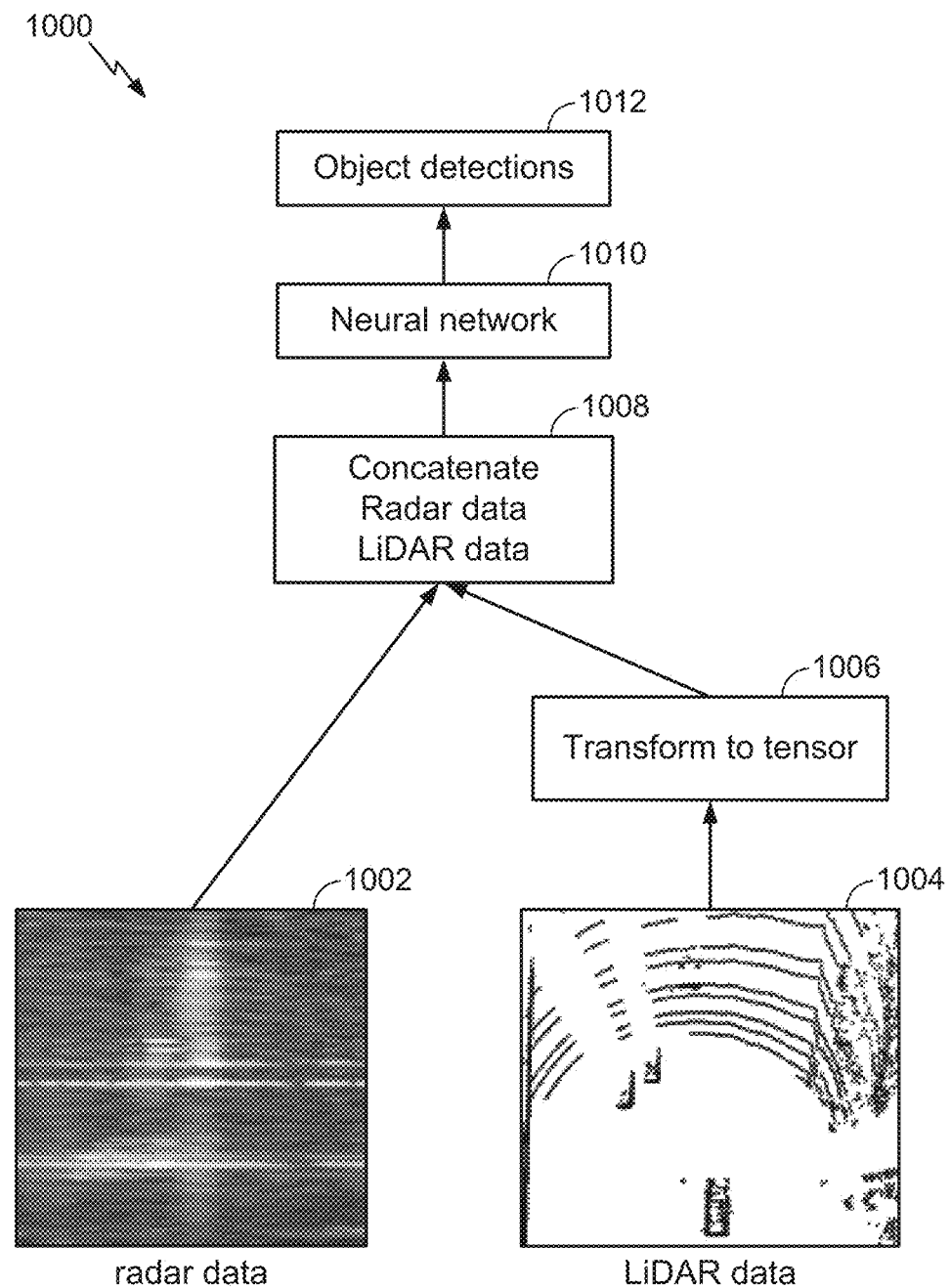
FIG. 10 illustrates a video frame, a radar frame in polar space, and an interpolated radar frame in Cartesian space.

In an aspect, early LiDAR-radar fusion can be performed to improve the quality of automatic annotations, as illustrated by method 1000 in FIG. 10. The method disclosed in "Fast and Furious: Real Time End-to-End 3D Detection, Tracking and Motion Forecasting with a Single Convolutional Net," can be used to convert the LiDAR point cloud data (1004) to a birds-eye view range-azimuth tensor (1006). This tensor can be concatenated (1008) to raw radar data (1002), which is used as input to the object detection neural network (1010) to perform object detection (1012). The radar and the LiDAR complement each other in that a radar is able to detect objects at long range, while the LiDAR provides detail at short range. In addition, LiDAR can sometimes "see" over other vehicles when it is mounted on top of the vehicle 100.

Figure 11:
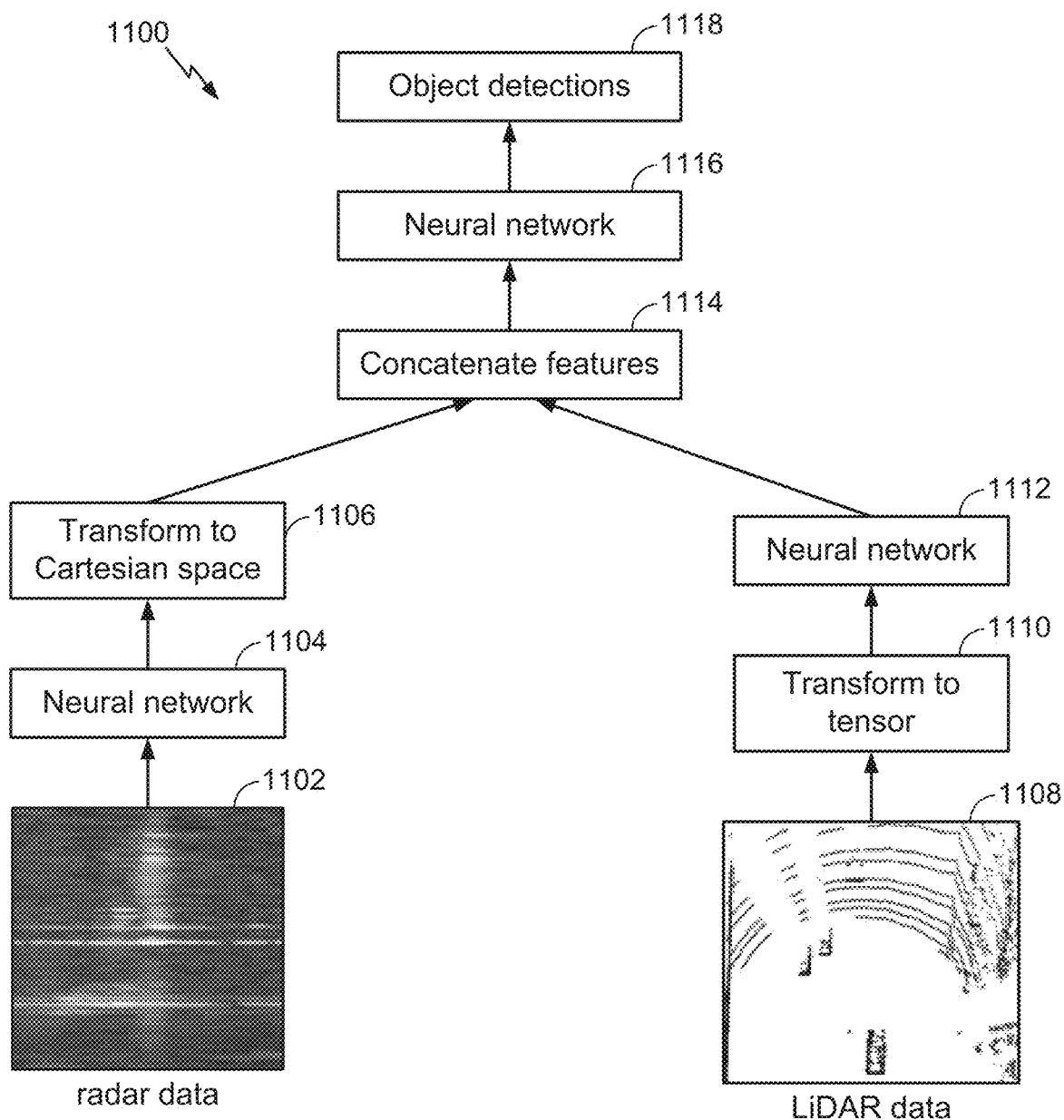
FIG. 11 illustrates a sampling grid in polar space, transformed to a sampling grid in Cartesian space.

In another aspect, intermediate LiDAR-radar fusion can be performed to improve the quality of automatic annotations, as illustrated by method 1100 in FIG. 11. Again, the method disclosed in "Fast and Furious: Real Time End-to-End 3D Detection, Tracking and Motion Forecasting with a Single Convolutional Net," can be used to convert LiDAR point cloud data (1108) into a birds-eye view Cartesian tensor (1110). A neural network (1104; 1112) processes the raw radar data (1102) and the LiDAR tensor (1110) in two separate branches to extract features. The radar features are transformed to Cartesian space (1106) using the method described below. The radar and LiDAR features are then concatenated (1114) for further processing by a neural network (1116) for object detection (1118).

Also disclosed herein is a neural network with polar to Cartesian transformation for radar signal processing. A goal of imaging radars for autonomous driving is to produce a radar-based system that outputs a high-resolution semantic representation of the world (the road world model). The road world model can provide the location of other vehicles, pedestrians and static objects, their dimensions, velocity, and so on. The imaging radar is realized through a combination of improved hardware (e.g., more antennas) and improved signal processing compared to traditional radar. On the signal processing side, deep learning techniques are used to interpret the radar signal (as in the various techniques described above).

Figure 12:
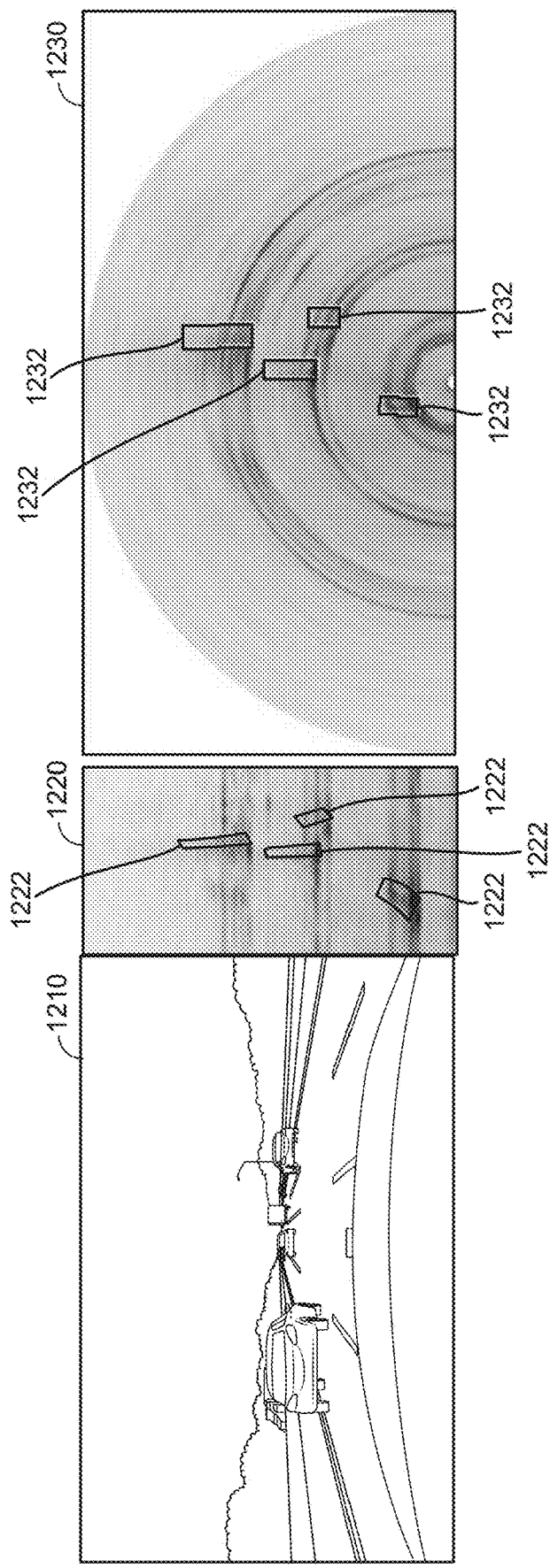
FIG. 12 illustrates an exemplary neural network architecture for vehicle detection in highway automotive scenarios, according to various aspects.

The "native format" of the radar signal is in polar coordinate space. In polar space, one axis represents range and the other axis represents azimuth, A radar frame is a 2D "image" of the power of the radar signal in each range-azimuth bin, as shown in FIG. 12. In FIG. 12, a camera frame 1210 is on the left, the original radar frame 1220 in polar space is in the center, and the interpolated radar frame 1230 in Cartesian space is on the right. Ground truth annotation boxes 1222 and 1232, representing object (here, vehicle) locations, are overlaid on the radar frame 1220 and the interpolated radar frame 1230, respectively.

This polar space arises from the way the radar sensor works. For example, azimuth directions are measured as phase differences between neighboring antennas and retrieved using the FFT algorithm. The radar can sense 180 degrees in principle, but the resolution is lower towards the far left and right edges of the resultant radar frame. The polar coordinate space presents a challenge for deep learning signal processing because the preferred output space for automotive applications is Cartesian (x-y).

Figure 13:
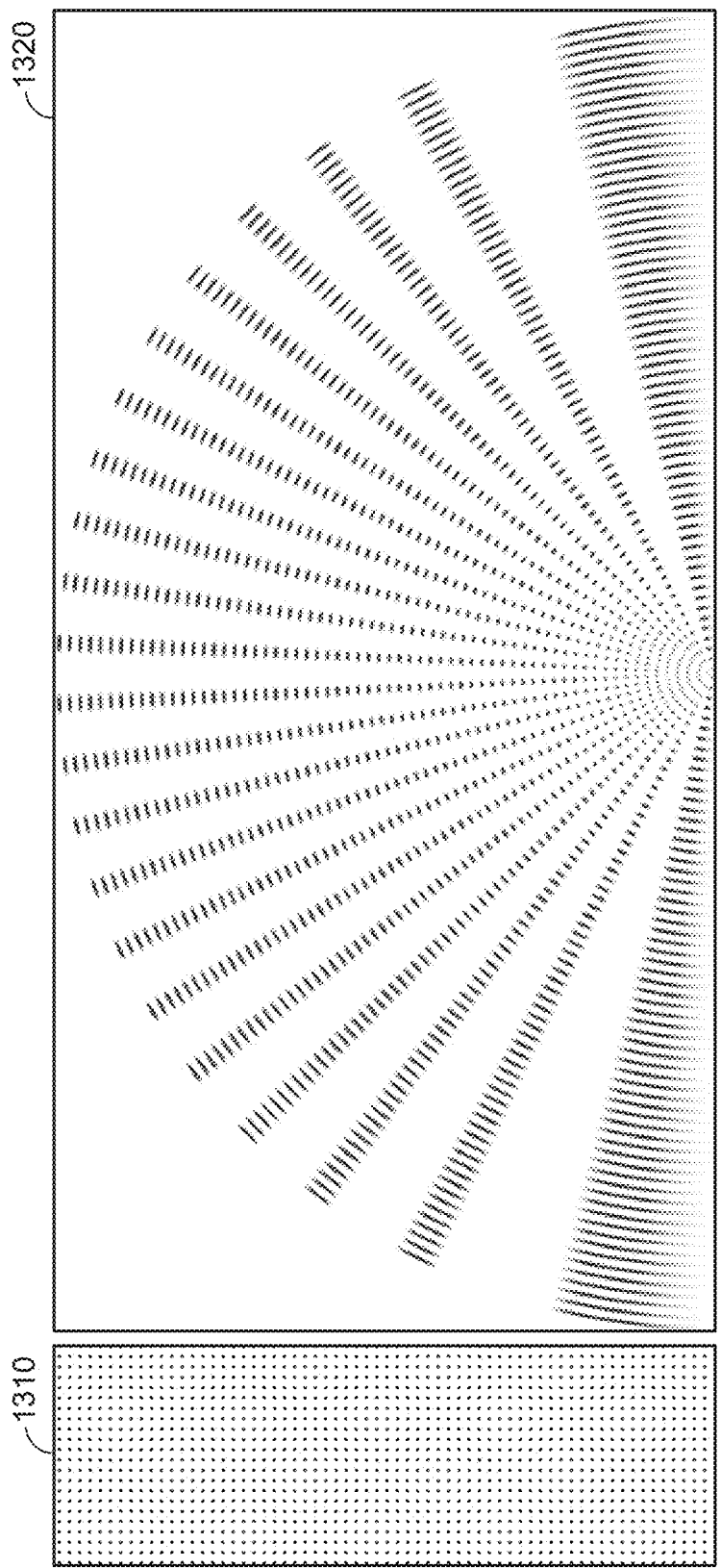
FIG. 13 illustrates a sampling grid.

FIG. 13 illustrates a sampling grid 1310 in polar space on the left, transformed to a sampling grid 1320 in Cartesian space on the right. As can be seen, the sampling grid 1320 gets increasingly sparse in the Cartesian space the further away from the radar source (i.e., the bottom center of the sampling grid 1320). FIG. 13 also shows that resolution is lower towards the left and right edges of the sampling grid 1320.

Figure 14:
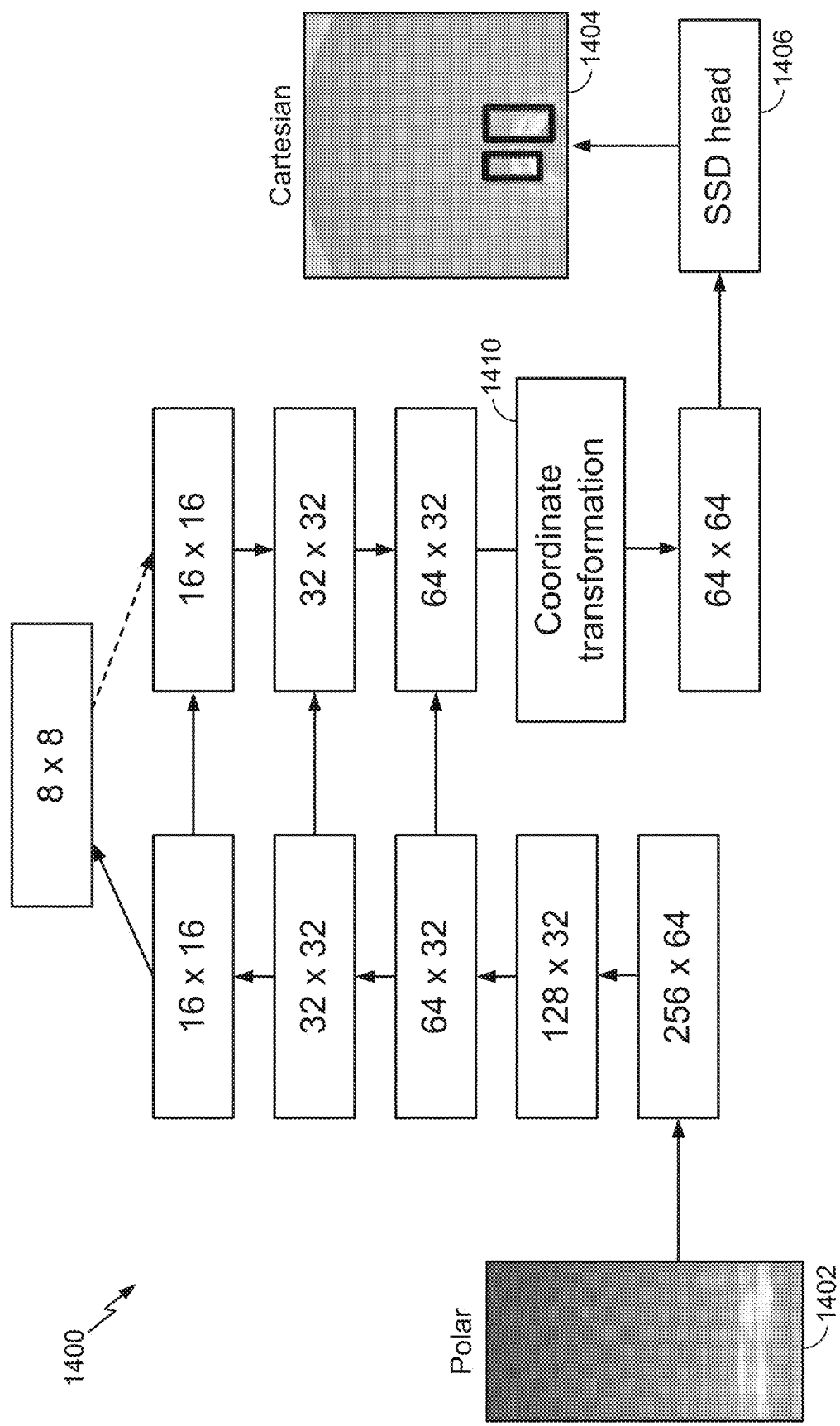
FIG. 14 illustrates a specific neural network architecture.

The present disclosure proposes a neural network that takes its input map in polar space, but outputs in Cartesian space. FIG. 14 illustrates an example neural network architecture 1400 for object detection in highway automotive scenarios. The transformation is performed inside the neural network through a fixed-function polar-to-Cartesian transformation layer 1410. That is, the neural network architecture 1400 does not have to learn the transformation. The fixed-function polar-to-Cartesian transformation layer 1410 maps the features from polar space (represented as a polar space frame 1402) to Cartesian space (represented as a Cartesian space frame 1404) using nearest neighbor mapping (an algorithm for estimating the value at a point in space when the true values are only known for discrete points by taking the value at the closest known sample), bi-linear interpolation, or bi-cubic interpolation (an extension of cubic interpolation for interpolating data points on a two-dimensional regular grid). After the transformation, the neural network architecture 1400 continues with several more convolutional layers (represented by the feature map having the resolution "64×64"). Finally, an "SSD head" 1406 performs object detections. The whole network is trained end-to-end (as opposed to piece-by-piece individually). The neural network architecture 1400 is referred to herein as a "polar-to-Cartesian" network. Note that the blocks/feature maps labeled "256×64," "128×32," "64×32," etc. are feature maps having the labeled resolution.

In practice, the full Cartesian map is not needed. For highway automotive applications, for example, it may only be preferable to see 250 meters ahead, but only 25 meters left to right. Hence, cropping is performed as part of the polar-to-Cartesian transformation, reducing computation time and memory usage.

There are a number of advantages to the end-to-end trainable neural network architecture 1400 with polar input space and Cartesian output space described above in FIG. 14. A first advantage is higher accuracy and more stable results. For example, the mAP, a measure for precision, may be increased by 20% (relative) by switching from Cartesian-to-Cartesian networks to polar-to-Cartesian networks (e.g., neural network architecture 1400). In a qualitative sense, the results of the polar-to-Cartesian network are superior to both polar-to-polar and Cartesian-to-Cartesian networks. For example, there is less flickering between frames and less missed detections.

A second advantage is that the computation time is reduced compared to the Cartesian-to-Cartesian network because the input can stay in the (storage efficient) polar space for most processing. In experiments, the polar-to-Cartesian network was 2.3 times faster than the Cartesian-to-Cartesian network.

Another advantage is that no post-processing is required to obtain objects in Cartesian space.

Another advantage is that as the output of the polar-to-Cartesian network (e.g., neural network architecture 1400) is in Cartesian coordinates, it has the advantage of translation equivariance, as opposed to polar coordinates, in which objects deform depending on where they are detected.

Yet another advantage is that only a single SSD head is needed because all vehicles have similar sizes. In polar space, nearby objects are detected as being very wide, requiring object detection at multiple feature layers.

Figure 15:
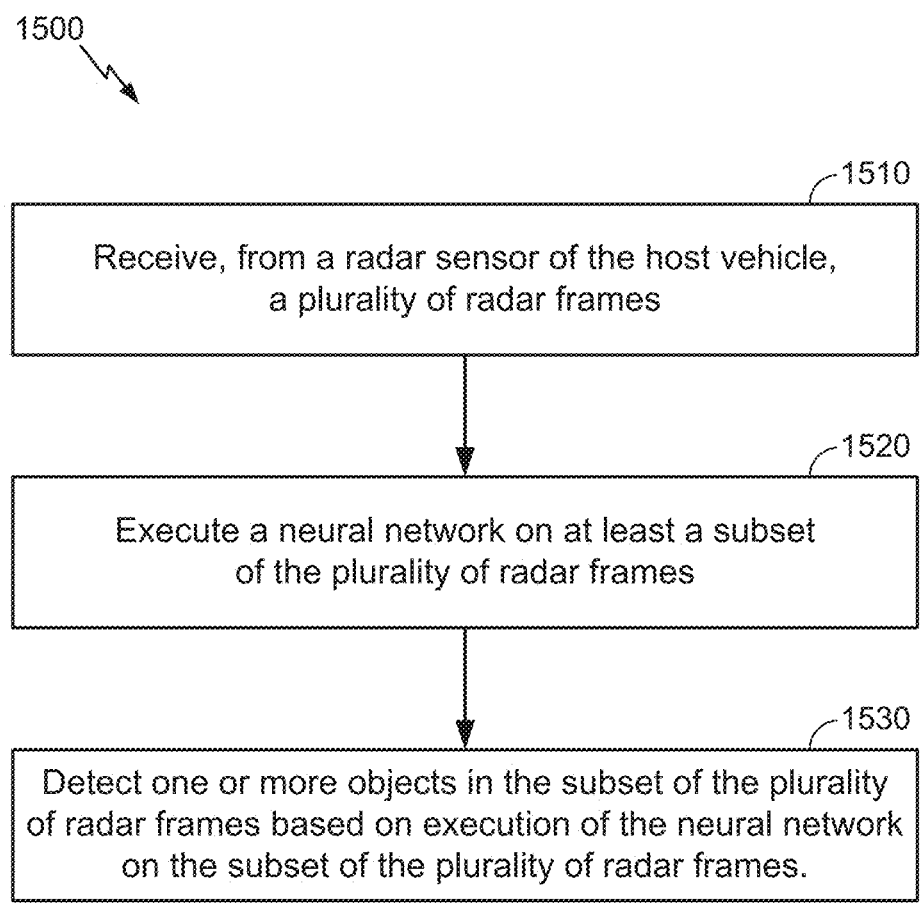
FIG. 15 illustrates an exemplary method of employing deep learning to analyze radar signals, according to aspects of the disclosure.

FIG. 15 illustrates an exemplary method 1500 of employing deep learning to analyze radar signals, according to aspects of the disclosure. In an aspect, the method 1500 may be performed by an on-board computer of a host vehicle, such as OBC 200 of vehicle 100.

At 1510, the OBC receives, from a radar sensor (e.g., radar 214) of the host vehicle, a plurality of radar frames (e.g., radar frames 420). In an aspect, operation 1510 may be performed by system interface(s) 210, data bus 208, memory 204, and/or processor(s) 206, any or all of which may be considered means for performing this operation.

At 1520, the OBC executes a neural network on at least a subset of the plurality of radar frames (e.g., key frames 702). In an aspect, operation 1520 may be performed by processor(s) 206, which may be considered means for performing this operation.

At 1530, the OBC detects one or more objects (e.g., vehicles) in the subset of the plurality of radar frames based on execution of the neural network on the subset of the plurality of radar frames. In an aspect, operation 1530 may be performed by processor(s) 206, which may be considered means for performing this operation.

Figure 16:
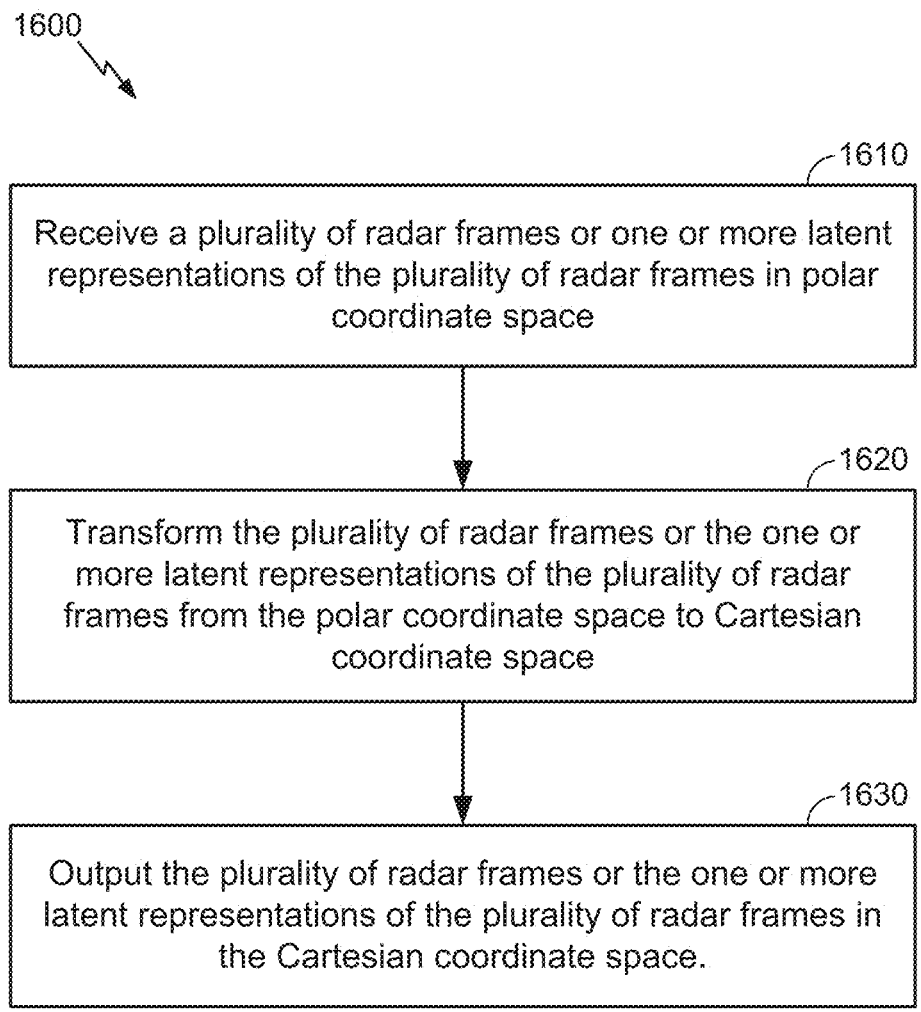
FIG. 16 illustrates an exemplary method of transforming polar coordinates to Cartesian coordinates in a neural network.

FIG. 16 illustrates an exemplary method 1600 of transforming polar coordinates to Cartesian coordinates in a neural network. In an aspect, the method 1600 may be performed by an on-board computer of a host vehicle, such as OBC 200 of vehicle 100.

At 1610, the OBC receives a plurality of radar frames (e.g., radar frame 420) or one or more latent representations of the plurality of radar frames (radar frames that have already been processed by the neural network) in polar coordinate space. In an aspect, operation 1610 may be performed by system interface(s) 210, data bus 208, memory 204, and/or processor(s) 206, any or all of which may be considered means for performing this operation.

At 1620, the OBC transforms the plurality of radar frames or the one or more latent representations of the plurality of radar frames from the polar coordinate space to Cartesian coordinate space. In an aspect, operation 1620 may be performed by processor(s) 206, which may be considered means for performing this operation.

At 1630, the OBC outputs the plurality of radar frames or the one or more latent representations of the plurality of radar frames in the Cartesian coordinate space. In an aspect, operation 1630 may be performed by system interface(s) 210, data bus 208, memory 204, and/or processor(s) 206, any or all of which may be considered means for performing this operation.

It should be noted that, although particular frequencies, integrated circuits (ICs), hardware, and other features are described in the aspects herein, alternative aspects may vary. That is, alternative aspects may utilize additional or alternative frequencies (e.g., other than the 60 GHz and/or 28 GHz frequency bands), antenna elements (e.g., having different size/shape of antenna element arrays), scanning periods (including both static and dynamic scanning periods), electronic devices (e.g., mobile phones, tablets, personal computer (PC), etc.), and/or other features. A person of ordinary skill in the art will appreciate such variations.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for personalized face verification with radar images.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of employing deep learning to analyze radar signals performed by an on-board computer of a host vehicle, comprising:
   receiving, from a radar sensor of the host vehicle, a plurality of radar frames;
   executing a neural network on at least a subset of the plurality of radar frames, wherein Light Detection And Ranging (LiDAR) data is concatenated with raw radar data into a single input tensor prior to executing the neural network on the subset of the plurality of radar frames; and
   detecting one or more objects in the subset of the plurality of radar frames based on execution of the neural network on the subset of the plurality of radar frames.

2. The method of claim 1, wherein the neural network comprises a recurrent neural network.

3. The method of claim 2, wherein detecting the one or more objects based on execution of the recurrent neural network is based on applying a single convolutional long short-term memory (LSTM) module to feature maps generated during execution of the recurrent neural network.

4. The method of claim 1, wherein execution of the neural network comprises application of a local spatial convolution to apply different convolution weights to different locations in the subset of the plurality of radar frames.

5. The method of claim 1, wherein execution of the neural network comprises a shallow neural network that generates all weights for different spatially variant kernels.

6. The method of claim 1, wherein execution of the neural network comprises use of an explicit transformation on each weight of the neural network.

7. The method of claim 1, wherein execution of the neural network comprises using non-maximum suppression to suppress overlapping bounding boxes.

8. The method of claim 7, further comprising:
estimating an uncertainty of detecting the one or more objects based on the overlapping bounding boxes.

9. The method of claim 1, wherein the subset of the plurality of radar frames consists of key frames of the plurality of radar frames, and wherein radar frames of the plurality of radar frames between the key frames comprise predicted frames (p-frames).

10. The method of claim 9, wherein an anomaly detection neural network identifies when to reset a boundary of a key frame based on an initial detection of an object in a p-frame of the plurality of radar frames.

11. The method of claim 1, wherein execution of the neural network comprises:
using separate feature extraction layers of the neural network for each of a set of slices comprising a range-azimuth slice, a range-Doppler slice, and an azimuth-Doppler slice; and
fusing the set of processed slices into a three-dimensional slice comprising parameters for range, azimuth, and Doppler.

12. The method of claim 1, wherein execution of the neural network comprises:
performing feature extraction on each radar frame of the subset of the plurality of radar frames to generate a feature map for each radar frame of the subset of the plurality of radar frames, wherein the feature map is in ego coordinates;
obtaining ego motion between each radar frame of the subset of the plurality of radar frames;
transforming the ego coordinates of each radar frame of the subset of the plurality of radar frames to world coordinates; and
combining the feature maps of the subset of the plurality of radar frames.

13. The method of claim 1, wherein the neural network is trained using annotations based on the subset of the plurality of radar frames with Light Detection And Ranging (LiDAR) data and/or camera data.

14. The method of claim 1, further comprising:
normalizing the plurality of radar frames prior to executing the neural network on the subset of the plurality of radar frames.

15. The method of claim 14, wherein the normalizing comprises:
calculating a mean and standard deviation of each radar frame of the plurality of radar frames at each range of the plurality of radar frames;
fitting a function to a result of the calculating; and
using the function to normalize the plurality of radar frames along the range dimension.

16. The method of claim 1, where radar data is processed by a first branch of the neural network, LiDAR data is processed by a second branch of the neural network, features of both branches are transformed to the same coordinate space and concatenated, and the one or more objects are detected based on the features of both branches.

17. An on-board computer of a host vehicle, comprising:
at least one processor configured to:
receive, from a radar sensor of the host vehicle, a plurality of radar frames;
execute a neural network on at least a subset of the plurality of radar frames, wherein Light Detection And Ranging (LiDAR) data is concatenated with raw radar data into a single input tensor prior to executing the neural network on the subset of the plurality of radar frames; and
detect one or more objects in the subset of the plurality of radar frames based on execution of the neural network on the subset of the plurality of radar frames.

18. The on-board computer of claim 17, wherein the subset of the plurality of radar frames consists of key frames of the plurality of radar frames, and wherein radar frames of the plurality of radar frames between the key frames comprise predicted frames (p-frames).

19. The on-board computer of claim 18, wherein an anomaly detection neural network identifies when to reset a boundary of a key frame based on an initial detection of an object in a p-frame of the plurality of radar frames.

20. The on-board computer of claim 17, wherein the at least one processor being configured to execute the neural network comprises the at least one processor being configured to:
use separate feature extraction layers of the neural network for each of a set of slices comprising a range-azimuth slice, a range-Doppler slice, and an azimuth-Doppler slice; and
fuse the set of processed slices into a three-dimensional slice comprising parameters for range, azimuth, and Doppler.

21. The on-board computer of claim 17, wherein the at least one processor being configured to execute the neural network comprises the at least one processor being configured to:
perform feature extraction on each radar frame of the subset of the plurality of radar frames to generate a feature map for each radar frame of the subset of the plurality of radar frames, wherein the feature map is in ego coordinates;
obtain ego motion between each radar frame of the subset of the plurality of radar frames;
transform the ego coordinates of each radar frame of the subset of the plurality of radar frames to world coordinates; and
combine the feature maps of the subset of the plurality of radar frames.

* * * * *